United States Patent
Hemani et al.

(10) Patent No.: US 12,430,898 B2
(45) Date of Patent: Sep. 30, 2025

(54) DEBIASING VISION-LANGUAGE MODELS WITH ADDITIVE RESIDUALS

(71) Applicant: Adobe Inc., San Jose, CA (US)

(72) Inventors: Mayur Hemani, Noida (IN); Chirag Agarwal, Noida (IN); Ashish Seth, Chennai (IN)

(73) Assignee: Adobe Inc., San Jose, CA (US)

(*) Notice: Subject to any disclaimer, the term of this patent is extended or adjusted under 35 U.S.C. 154(b) by 364 days.

(21) Appl. No.: 18/322,253

(22) Filed: May 23, 2023

(65) Prior Publication Data

US 2024/0395024 A1   Nov. 28, 2024

(51) Int. Cl.
| | |
|---|---|
| G06V 10/776 | (2022.01) |
| G06F 16/33 | (2025.01) |
| G06F 16/3331 | (2025.01) |
| G06F 40/40 | (2020.01) |
| G06V 10/74 | (2022.01) |
| G06V 10/764 | (2022.01) |
| G06V 10/77 | (2022.01) |
| G06V 10/82 | (2022.01) |

(52) U.S. Cl.
CPC ........ *G06V 10/776* (2022.01); *G06F 16/3331* (2019.01); *G06F 40/40* (2020.01); *G06V 10/761* (2022.01); *G06V 10/764* (2022.01); *G06V 10/7715* (2022.01); *G06V 10/82* (2022.01)

(58) Field of Classification Search
CPC ............. G06V 10/776; G06V 10/7715; G06V 10/761; G06V 10/82; G06V 10/764; G06F 16/3331; G06F 40/40
See application file for complete search history.

(56) References Cited

PUBLICATIONS

Wang et al, "Are Gender-Neutral Queries Really Gender-Neutral? Mitigating Gender Bias in Image Search", 2021, arXiv preprint arXiv:2109.05433 (14 Pages) (Year: 2021).*
Pan et al, "Contrastive Disentanglement in Generative Adversarial Networks", 2021, arXiv:2103.03636v1 (10 Pages_ (Year: 2021).*
Li et al. "Supporting Vision-Language Model Inference with Confounder-pruning Knowledge Prompt." 2020, arXiv preprint arXiv:2205.11100 (17 Pages) (Year: 2020).*
Jian Kang and Hanghang Tong. Fair graph mining. In ACM International Conference on Information & Knowledge Management, 2021.

(Continued)

*Primary Examiner* — David F Dunphy
(74) *Attorney, Agent, or Firm* — Keller Preece PLLC

(57) ABSTRACT

The present disclosure relates to systems, non-transitory computer-readable media, and methods for debiasing vision-language models utilizing additive residual learning. In particular, in one or more embodiments, the disclosed systems generate an encoded image representation of a digital image utilizing an image encoder of a vision-language neural network. Additionally, in some embodiments, the disclosed systems extract a protected attribute encoding from the encoded image representation of the digital image utilizing an additive residual learner. Upon extracting the protected attribute encoding, in some implementations, the disclosed systems determine a debiased image encoding for the digital image by combining the protected attribute encoding and the encoded image representation.

20 Claims, 12 Drawing Sheets

(56) References Cited

PUBLICATIONS

Abeba Birhane, Vinay Uday Prabhu, and Emmanuel Kahembwe. Multimodal datasets: misogyny, pornography, and malignant stereotypes. CoRR, abs/2110.01963, 2021.
Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In ICML, 2021.
Alec Radford, Karthik Narasimhan, Tim Salimans, Ilya Sutskever, et al. Improving language understanding by generative pre-training. 2018.
Alex Krizhevsky, Geoffrey Hinton, et al. Learning multiple layers of features from tiny images. 2009.
Alex Shonenkov, Sergey Shtekhin, and Denis Karachev. Clip object detection & segmentation. https://github.com/shonenkov/CLIP-ODS, 2021.
Amanpreet Singh, Ronghang Hu, Vedanuj Goswami, Guillaume Couairon, Wojciech Galuba, Marcus Rohrbach, and Douwe Kiela. Flava: A foundational language and vision alignment model. In CVPR, 2022.
Angelina Wang, Alexander Liu, Ryan Zhang, Anat Kleiman, Leslie Kim, Dora Zhao, Iroha Shirai, Arvind Narayanan, and Olga Russakovsky. Revise: A tool for measuring and mitigating bias in visual datasets. IJCV, 2022.
Antoine Miech, Jean-Baptiste Alayrac, Ivan Laptev, Josef Sivic, and Andrew Zisserman. Rareact: A video dataset of unusual interactions. arXiv preprint arXiv:2008.01018, 2020.
Brian Hu Zhang, Blake Lemoine, and Margaret Mitchell. Mitigating unwanted biases with adversarial learning. In AIES, 2018.
Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In ICML, 2021. 2.
Chirag Agarwal, Himabindu Lakkaraju, and Marinka Zitnik. Towards a unified framework for fair and stable graph representation learning. In UAI, 2021.
Conrad Borchers, Dalia Sara Gala, Benjamin Gilburt, Eduard Oravkin, Wilfried Bounsi, Yuki M Asano, and Hannah Rose Kirk. Looking for a handsome carpenter! debiasing gpt-3 job advertisements. ACL Workshop on Gender Bias in Natural Language Processing (GeBNLP), 2022.
Diederik P. Kingma and Jimmy Ba. Adam: A method for stochastic optimization. In Yoshua Bengio and Yann LeCun, editors, 3rd International Conference on Learning Representations, ICLR 2015, San Diego, CA, USA, May 7-9, 2015, Conference Track Proceedings, 2015.
Faisal Kamiran and Toon Calders. Data preprocessing techniques for classification without discrimination. Knowledge and information systems, 2012.
Faisal Kamiran, Asim Karim, and Xiangliang Zhang. Decision theory for discrimination-aware classification. In ICDM, 2012.
Flavio Calmon, Dennis Wei, Bhanukiran Vinzamuri, Karthikeyan Natesan Ramamurthy, and Kush R Varshney. Optimized pre-processing for discrimination prevention. In NeurIPS, 2017.
Geoff Pleiss, Manish Raghavan, Felix Wu, Jon Kleinberg, and Kilian Q Weinberger. On fairness and calibration. In NeurIPS, 2017.
Hannah Rose Kirk, Yennie Jun, Filippo Volpin, Haide rlqbal, Elias Benussi, Frederic Dreyer, Aleksandar Shtedritski, and Yuki Asano. Bias out-of-the-box: An empirical analysis of intersectional occupational biases in popular generative language models. NeurIPS, 2021.
Hieu Pham, Zihang Dai, Golnaz Ghiasi, Hanxiao Liu, Adams Wei Yu, Minh-Thang Luong, Mingxing Tan, and Quoc V Le. Combined scaling for zero-shot transfer learning. arXiv, 2021.
Hugo Berg, Siobhan Mackenzie Hall, Yash Bhalgat, Wonsuk Yang, Hannah Rose Kirk, Aleksandar Shtedritski, and Max Bain. A prompt array keeps the bias away: Debiasing vision-language models with adversarial learning. In AACL, 2022.
Jacob Devlin, Ming-Wei Chang, Kenton Lee, and Kristina Toutanova. Bert: Pre-training of deep bidirectional transformers for language understanding. arXiv, 2018.
Jaemin Cho, Seunghyun Yoon, Ajinkya Kale, Franck Dernoncourt, Trung Bui, and Mohit Bansal. Fine-grained image captioning with CLIP reward. In Findings of the Association for Computational Linguistics: NAACL 2022, pp. 517-527, Seattle, United States, Jul. 2022. Association for Computational Linguistics.
Jia Deng, Wei Dong, Richard Socher, Li-Jia Li, Kai Li, and Li Fei-Fei. Imagenet: A large-scale hierarchical image database. In 2009 IEEE Conference on Computer Vision and Pattern Recognition, pp. 248-255, 2009.
Jialu Wang, Yang Liu, and Xin Eric Wang. Are gender-neutral queries really gender-neutral? mitigating gender bias in image search. In EMNLP, 2021.
Jiasen Lu, Vedanuj Goswami, Marcus Rohrbach, Devi Parikh, and Stefan Lee. 12-in-1: Multi-task vision and language representation learning. In CVPR, 2020.
Jing Ma, Ruocheng Guo, Mengting Wan, Longqi Yang, Aidong Zhang, and Jundong Li. Learning fair node representations with graph counterfactual fairness. In ACM International Conference on Web Search and Data Mining, 2022.
Joao Carreira, Eric Noland, Chloe Hillier, and Andrew Zisserman. A short note on the kinetics—700 human action dataset. arXiv preprint arXiv:1907.06987, 2019.
Junnan Li, Dongxu Li, Caiming Xiong, and Steven Hoi. Blip: Bootstrapping language-image pre-training for unified vision-language understanding and generation. In ICML, 2022.
Junnan Li, Ramprasaath R. Selvaraju, Akhilesh Deepak Gotmare, Shafiq Joty, Caiming Xiong, and Steven Hoi. Align before fuse: Vision and language representation learning with momentum distillation. In NeurIPS, 2021.
Jure Zbontar, Li Jing, Ishan Misra, Yann LeCun, and Stephane Deny. Barlow twins: Self-supervised learning via redundancy reduction. In ICML, 2021.
Kaiming He, Haoqi Fan, Yuxin Wu, Saining Xie, and Ross Girshick. Momentum contrast for unsupervised visual representation learning. In CVPR, 2020.
Karan Desai and Justin Johnson. Virtex: Learning visual representations from textual annotations. In CVPR, 2021.
Khurram Soomro, Amir Roshan Zamir, and Mubarak Shah. Ucf101: A dataset of 101 human actions classes from videos in the wild. arXiv preprint arXiv:1212.0402, 2012.
Kimmo Karkkainen and Jungseock Joo. Fairface: Face attribute dataset for balanced race, gender, and age for bias measurement and mitigation. In WACV, 2021.
Liunian Harold Li, Mark Yatskar, Da Yin, Cho-Jui Hsieh, and Kai-Wei Chang. Visualbert: A simple and performant baseline for vision and language. arXiv, 2019.
Moritz Hardt, Eric Price, and Nati Srebro. Equality of opportunity in supervised learning. In NeurIPS, 2016.
Nan Wang, Lu Lin, Jundong Li, and Hongning Wang. Un-biased graph embedding with biased graph observations. In WWW, 2022.
Pengchuan Zhang, Xiujun Li, Xiaowei Hu, Jianwei Yang, Lei Zhang, Lijuan Wang, Yejin Choi, and Jianfeng Gao. Vinvl: Revisiting visual representations in vision-language models. In CVPR, 2021.
Rich Zemel, Yu Wu, Kevin Swersky, Toni Pitassi, and Cynthia Dwork. Learning fair representations. In ICML, 2013.
Rowan Zellers, Ximing Lu, Jack Hessel, Youngjae Yu, Jae Sung Park, Jize Cao, Ali Farhadi, and Yejin Choi. Mer-lot: Multimodal neural script knowledge models. NeurIPS, 2021.
Ruth C Fong and Andrea Vedaldi. Interpretable explanations of black boxes by meaningful perturbation. In ICCV, 2017.
Sahin Cem Geyik, Stuart Ambler, and Krishnaram Kentha-padi. Fairness-aware ranking in search & recommendation systems with application to linkedin talent search. CoRR, abs/1905.01989, 2019.
Sheng Shen, Liunian Harold Li, Hao Tan, Mohit Bansal, Anna Rohrbach, Kai-Wei Chang, Zhewei Yao, and Kurt Keutzer. How much can clip benefit vision-and-language tasks? arXiv preprint arXiv:2107.06383, 2021.
Tianlu Wang, Jieyu Zhao, Mark Yatskar, Kai-Wei Chang, and Vicente Ordonez. Balanced datasets are not enough: Estimating and

(56) References Cited

PUBLICATIONS mitigating gender bias in deep image representations. In International Conference on Computer Vision (ICCV), Oct. 2019.

Timnit Gebru, Jamie Morgenstern, Briana Vecchione, Jennifer Wortman Vaughan, Hanna Wallach, Hal Daumelii, and Kate Crawford. Datasheets for datasets. Communications of the ACM, 2021.

Ting Chen, Simon Kornblith, Mohammad Norouzi, and Geoffrey Hinton. A simple framework for contrastive learning of visual representations. In ICML, 2020.

Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. Language models are few-shot learners. In NeurIPS, 2020.

Toshihir Kamishima, Shotaro Akaho, Hideki Asoh, and Jun Sakuma. Fairness-aware classifier with prejudice remover regularizer. In Joint European conference on machine learning and knowledge discovery in databases, 2012.

Wei Guo and Aylin Caliskan. Detecting emergent intersectional biases: Contextualized word embeddings contain a distribution of human-like biases. In AIES, 2021.

Wenhui Wang, Hangbo Bao, Li Dong, and Furu Wei. VLMo: Unified vision-language pre-training with mixture-of-modality-experts. 2021.

Wonjae Kim, Bokyung Son, and Ildoo Kim. Vilt: Vision-and-language transformer without convolution or region supervision. In ICML, 2021.

Xinlei Chen and Kaiming He. Exploring simple siamese representation learning. In CVPR, 2021.

Xinlei Chen, Haoqi Fan, Ross Girshick, and Kaiming He. Improved baselines with momentum contrastive learning. arXiv, 2020.

Xiujun Li, Xi Yin, Chunyuan Li, Pengchuan Zhang, Xiaowei Hu, Lei Zhang, Lijuan Wang, Houdong Hu, Li Dong, Furu Wei, et al. Oscar: Object-semantics aligned pre-training for vision-language tasks. In ECCV, 2020.

Xiuye Gu, Tsung-Yi Lin, Weicheng Kuo, and Yin Cui. Open-vocabulary object detection via vision and language knowledge distillation. In ICLR, 2022.

Yangguang Li, Feng Liang, Lichen Zhao, Yufeng Cui, Wanli Ouyang, Jing Shao, Fengwei Yu, and Junjie Yan. Supervision exists everywhere: A data efficient contrastive language-image pre-training paradigm. In ICLR, 2022.

Yen-Chun Chen, Linjie Li, Licheng Yu, Ahmed El Kholy, Faisal Ahmed, Zhe Gan, Yu Cheng, and Jingjing Liu. Uniter: Universal image-text representation learning. In ECCV, 2020.

Zhifei Zhang, Yang Song, and Hairong Qi. Age progression/regression by conditional adversarial autoencoder. In CVPR, 2017.

\* cited by examiner

| PA | +/- | MaxSkew [C] | [C]$_D$ | MinSkew [C] | [C]$_D$ | MaxSkew [F] | [F]$_D$ | MinSkew [F] | [F]$_D$ |
|---|---|---|---|---|---|---|---|---|---|
| Age | +ve | 0.36 | 0.10 | -0.25 | -0.09 | 0.33 | 0.08 | -0.34 | -0.35 |
| Age | -ve | 0.54 | 0.45 | -0.53 | -0.43 | 0.48 | 0.20 | -0.37 | -0.26 |
| Race | +ve | 0.49 | 0.33 | -0.85 | -0.69 | 0.31 | 0.37 | -0.54 | -0.45 |
| Race | -ve | 0.59 | 0.55 | -2.49 | -0.87 | 0.38 | 0.26 | -0.54 | -0.42 |
| Gender | +ve | 0.29 | 0.19 | -0.60 | -0.32 | 0.25 | 0.14 | -0.44 | -0.22 |
| Gender | -ve | 0.22 | 0.21 | -0.41 | -0.34 | 0.29 | 0.14 | -0.57 | -0.18 |

| PA | +/- | MS@k | | mS@k | | MS@k | | mS@k | |
|---|---|---|---|---|---|---|---|---|---|
| Age | +ve | 0.48 | 0.14 | -0.22 | -0.08 | 0.42 | 0.23 | -3.47 | -3.41 |
| Age | -ve | 0.71 | 0.38 | -2.58 | -2.50 | 0.51 | 0.31 | -2.84 | -2.36 |
| Race | +ve | 0.55 | 0.40 | -3.19 | -0.61 | 0.48 | 0.59 | -2.70 | -2.89 |
| Race | -ve | 0.84 | 0.62 | -5.12 | -6.28 | 0.45 | 0.38 | -0.79 | -1.85 |
| Gender | +ve | 0.29 | 0.17 | -0.57 | -0.29 | 0.21 | 0.12 | -2.38 | -0.14 |
| Gender | -ve | 0.36 | 0.14 | -7.71 | -0.22 | 0.30 | 0.17 | -2.90 | -2.62 |

*Fig. 8*

DEBIASING VISION-LANGUAGE MODELS WITH ADDITIVE RESIDUALS

BACKGROUND

Recent years have seen developments in hardware and software platforms implementing vision-language models for various vision-grounded language tasks by providing rich, adaptable image-and-text representations. For example, conventional vision-language systems analyze images to identify objects portrayed in those images, and to determine whether the objects relate to a text query. To illustrate, conventional vision-language systems determine a set of images with objects relating to the text query and provide the set of images as output in response to an image search. Despite these developments, conventional systems suffer from a number of technical deficiencies, including inaccuracy (by providing biased sets of images for search queries), and inefficiency (by using excessive computing resources to determine the sets of images).

BRIEF SUMMARY

Embodiments of the present disclosure provide benefits and/or solve one or more problems in the art with systems, non-transitory computer-readable media, and methods for debiasing vision-language models utilizing additive residual learning. In some embodiments, the disclosed systems reduce societal biases that result from skewed distributions of identity groups in training data and which therefore manifest in predictions generated by existing vision-language models ("VLMs"). To reduce such biases, in some cases, the disclosed systems extract protected attribute encodings from image encodings to determine debiased image encodings for digital images. To illustrate, in some implementations, the disclosed systems use a vision-language model to generate an image encoding for a digital image. Moreover, in some embodiments, the disclosed systems utilize an additive residual learner to generate an additive residual for the digital image by disentangling protected-attribute information (e.g., information relating to race, gender, and/or age) from the image encoding. Furthermore, in some embodiments, the disclosed systems generate a debiased image encoding for the digital image by combining the additive residual with the image encoding.

In some implementations, the disclosed systems receive a text query (e.g., a textual search request for an image depicting a particular type of person, such as a doctor). Upon receiving the text query, in some embodiments, the disclosed systems compare a text encoding of the text query with a debiased image encoding of a digital image to determine a similarity between the digital image and the text query. Repeating this process for multiple digital images, in some implementations, the disclosed systems identify a debiased set of images corresponding to the text query. Additionally, in some embodiments, the disclosed systems train an additive residual learner to generate additive residuals for digital images.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 8 illustrates a table of skew metrics demonstrating bias reductions effected by the VLM debiasing system for two vision-language models in accordance with one or more embodiments.

DETAILED DESCRIPTION

Figure 1:
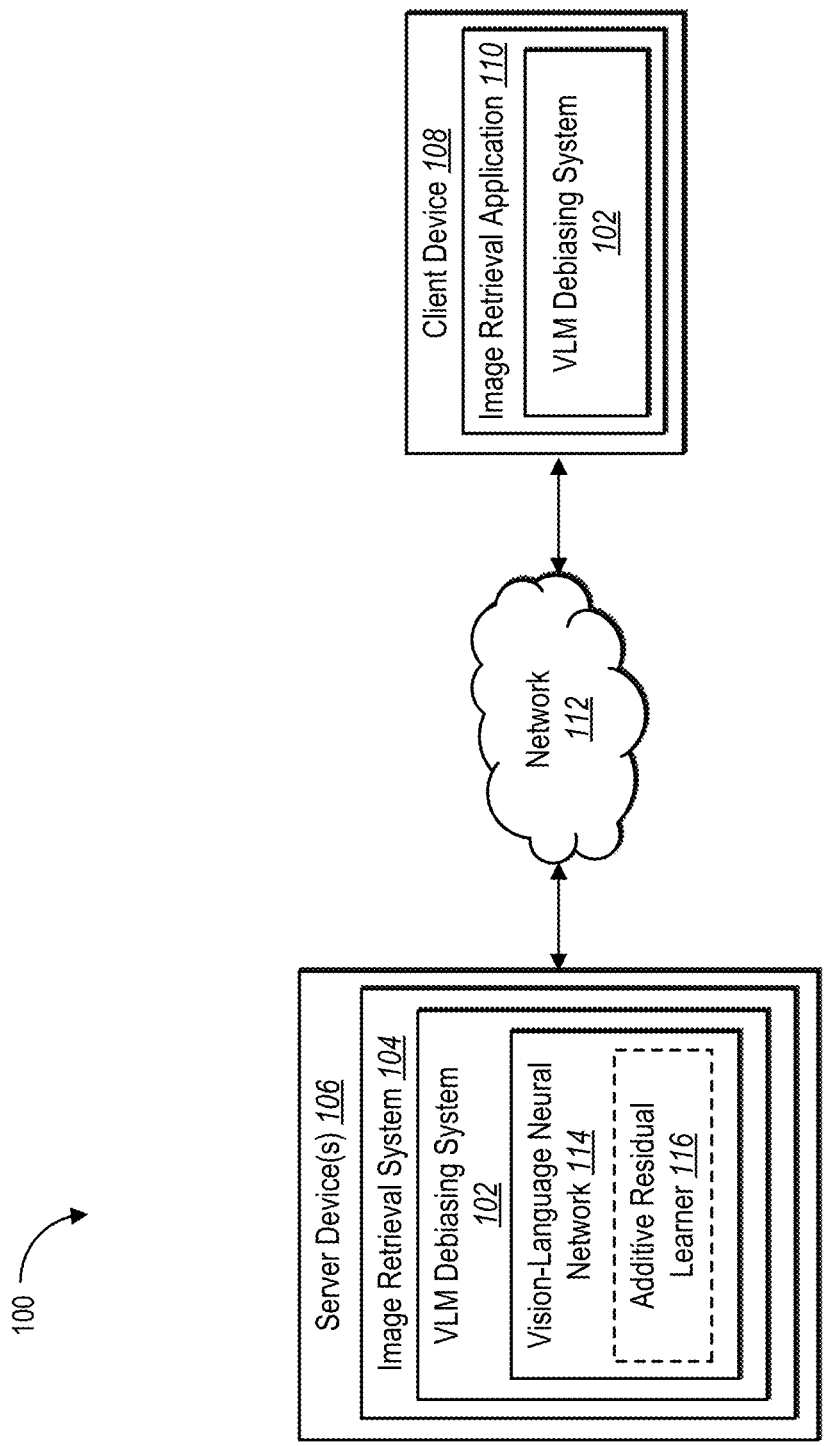
FIG. 1 illustrates a diagram of an environment in which a VLM debiasing system operates in accordance with one or more embodiments.

This disclosure describes one or more embodiments of a vision-language model debiasing system ("VLM debiasing system") that utilizes additive residuals to debias vision-language models. For example, in some implementations, the VLM debiasing system uses a vision-language neural network to generate an encoded image representation of a digital image. In some embodiments, the VLM debiasing system utilizes an additive residual learner to generate a protected attribute encoding for the digital image by extracting protected-attribute information from the encoded image representation. Additionally, in certain instances, the VLM debiasing system generates a debiased image encoding for the digital image by combining the protected attribute encoding and the encoded image representation. In some cases, the protected attribute encoding has a negative value, and combining the protected attribute encoding with the encoded image representation thus effectively removes encoded protected attribute data from the encoded image representation.

To illustrate, in one or more embodiments, the VLM debiasing system extracts the protected attribute encoding from the encoded image representation of the digital image by disentangling protected-attribute information from non-protected-attribute information encoded within the encoded image representation. For example, given an image that depicts a subject having a particular race, gender, and age, the VLM debiasing system disentangles information about the subject's race, gender, and age from an encoded image representation of the image. For instance, the VLM debiasing system subtracts protected-attribute information contained within the protected attribute encoding from image information contained within the encoded image representation.

In some embodiments, the VLM debiasing system trains an additive residual learner to generate or extract protected attribute encodings from digital images. For example, the VLM debiasing system tunes parameters of the additive residual learner based on one or more measures of loss. To illustrate, in some implementations, the VLM debiasing system determines a reconstruction loss based on a measure of similarity between the encoded image representation and the debiased image encoding. In some embodiments, the VLM debiasing system utilizes an adversarial neural network (e.g., a specialized neural network called a protected attribute classifier) to classify images by one or more protected attributes based on debiased image encodings for the images. Using image classification predictions from the adversarial neural network, in some implementations the VLM debiasing system determines an entropy loss and/or a cross-entropy loss to measure the success of the additive residual learner in generating the protected attribute encodings. In some cases, the VLM debiasing system further updates or modifies parameters of the additive residual learner to reduce one or more of the measures of loss.

In some implementations, the VLM debiasing system receives a text query in a request to retrieve one or more images. Upon receiving the text query, in some embodiments, the VLM debiasing system compares an encoded text representation of the text query with a debiased image encoding of a digital image to determine a similarity between the digital image and the text query. In some cases, the VLM debiasing system compares numerous debiased image encodings (for numerous digital images, each debiased image encoding being for a different digital image) with the encoded text representation to determine a set of images that corresponds to the text query. By utilizing the debiased image encodings, in some cases the VLM debiasing system provides image search results that are less biased than the results offered by prior systems.

In addition, in some embodiments, the VLM debiasing system receives a text query in a request to identify or segment objects portrayed in one or more images. For instance, the VLM debiasing system receives a request to identify each instance of a doctor in an image. In some implementations, the VLM debiasing system compares an encoded text representation of the text query with a debiased image encoding of the image. Additionally, in some cases, the VLM debiasing system analyzes information contained within the debiased image encoding to associate instances of the request subject (e.g., instances of doctors) portrayed in the image with the text query. In one or more embodiments, the VLM debiasing system then segments the image in accordance with the associations made (e.g., utilizing bounding boxes, segmentation masks, etc.) to identify objects that correspond with the text query.

Although conventional vision-language systems can identify images with objects relating to a text query, such systems have a number of problems in relation to accuracy and efficiency of operation. For instance, conventional vision-language systems inaccurately determine sets of images that represent diverse groups of people. Specifically, conventional systems are generally biased with respect to fairly representing various groups of people when retrieving images. For example, conventional vision-language systems sometimes disproportionately exclude members of one or more classes or identity groups (e.g., a particular race, gender, and/or age) when responding to a search for images portraying people of a reputable profession or a reputable characteristic (e.g., doctor, happy person, etc.). Relatedly, conventional vision-language systems sometimes disproportionately include members of one or more classes or identity groups when responding to a search for images portraying people of a disreputable characteristic (e.g., criminal, homeless person, etc.).

In addition, conventional vision-language systems inefficiently attempt to rectify bias in image search results. For instance, conventional vision-language systems utilize excessive computational resources (e.g., memory usage, storage space, bandwidth, computing time, etc.). For example, some conventional vision-language systems attempt to retrain vision-language models utilizing new datasets having reduced bias. Obtaining new datasets is costly in terms of bandwidth and storage space to obtain and store the new data (e.g., some training datasets have hundreds of millions of digital images). Moreover, retraining the vision-language models is computationally expensive due to the large amount of computing time and memory used to retrain the models (e.g., to generate image and text encodings from the training dataset, and to modify parameters of the vision-language model).

The VLM debiasing system provides a variety of technical advantages relative to conventional systems. For example, by disentangling protected-attribute information from non-protected-attribute information in image encodings, some embodiments of the VLM debiasing system improve accuracy of unbiased results relative to conventional systems. Specifically, the VLM debiasing system generates a debiased image encoding for a digital image, and utilizes the debiased image encoding to determine a comparison of the digital image with a text query. Consequently, in some cases, the VLM debiasing system reduces the degree to which vision-language models use protected-attribute information when selecting images for search results and/or image segmentation. To illustrate, in some implementations, the VLM debiasing system reduces skew metrics for a dataset of images based on a proportion of a given protected attribute in a selected subset for a text query over a proportion of the same protected attribute in the overall dataset. Thus, some implementations of the VLM debiasing system improve the fairness of vision-language model outputs, thereby improving accuracy of delivering unbiased results.

Moreover, the VLM debiasing system improves efficiency of determining image search results relative to conventional systems. For example, some embodiments of the VLM debiasing system reduce computational expense (e.g., time, memory, storage, bandwidth, etc.) by disentangling protected-attribute information from non-protected-attribute information in image encodings without modifying text encodings. Thus, in some cases, the VLM debiasing system limits the amount of data modified during an image retrieval and/or segmentation process, thereby reducing computational resources required. Additionally, in some implementations, the VLM debiasing system improves computational efficiency by retrieving unbiased search results from the vision-language model without retraining the vision-language model to be unbiased. To illustrate, in some embodiments, the VLM debiasing system uses the image encoder of the vision-language model (which may be biased) as-is, and adapts search results for a particular text query to be an unbiased representation across protected attributes. Therefore, the VLM debiasing system alleviates computing systems of storage space, bandwidth, memory usage, and computing time that would otherwise be expended to obtain new training datasets and to retrain the vision-language model.

Additional detail will now be provided in relation to illustrative figures portraying example embodiments and implementations of a VLM debiasing system. For example, FIG. 1 illustrates a system 100 (or environment) in which a VLM debiasing system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes an image retrieval system 104 that further includes the VLM debiasing system 102. In some embodiments, the VLM debiasing system 102 utilizes an image encoder of a vision-language neural network 114 to generate an encoded image representation of a digital image. In some implementations, the VLM debiasing system 102 disentangles protected-attribute information from non-protected-attribute information encoded within the encoded image representation and determines a debiased image encoding for the digital image. In some embodiments, the VLM debiasing system 102 trains an additive residual learner 116 to extract a protected attribute encoding from the encoded image representation of the digital image. In some implementations, the additive residual learner 116 is part of the vision-language neural network 114 (e.g., a layer of the vision-language neural network 114). Alternatively, in some implementations, the additive residual learner 116 is separate from the vision-language neural network 114 (e.g., a separate machine-learning model). In some embodiments, the server device(s) 106 includes, but is not limited to, a computing device (such as explained below with reference to FIG. 11).

In some instances, the VLM debiasing system 102 receives a request (e.g., from the client device 108, from the image retrieval system 104, etc.) to provide image search results corresponding to a text query. For example, the text query includes a prompt for a particular type of image. Some embodiments of server device(s) 106 perform a variety of functions via the image retrieval system 104 on the server device(s) 106. For example, the server device(s) 106 (through the VLM debiasing system 102 on the image retrieval system 104) performs functions such as, but not limited to, generating an encoded image representation of a digital image, extracting a protected attribute encoding from the encoded image representation of the digital image, and determining a debiased image encoding for the digital image by combining the protected attribute encoding and the encoded image representation. In some embodiments, the server device(s) 106 utilizes the vision-language neural network 114 to generate the encoded image representation. In some cases, the server device(s) 106 performs these functions for numerous digital images (e.g., across a set of digital images), and selects a subset of digital images from the set of digital images for display via the client device 108. In some embodiments, the server device(s) 106 trains the additive residual learner 116 as described herein.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 11. Some embodiments of client device 108 perform a variety of functions via an image retrieval application 110 on client device 108. For example, the client device 108 (through the image retrieval application 110) performs functions such as, but not limited to, generating an encoded image representation of a digital image, extracting a protected attribute encoding from the encoded image representation of the digital image, and determining a debiased image encoding for the digital image by combining the protected attribute encoding and the encoded image representation. In some embodiments, the client device 108 utilizes the vision-language neural network 114 to generate the encoded image representation. In some cases, the client device 108 performs these functions for numerous digital images (e.g., across a set of digital images), and selects a subset of digital images from the set of digital images for display via the client device 108. In some embodiments, the client device 108 trains the additive residual learner 116 as described herein.

To access the functionalities of the VLM debiasing system 102 (as described above and in greater detail below), in one or more embodiments, a user interacts with the image retrieval application 110 on the client device 108. For example, the image retrieval application 110 includes one or more software applications (e.g., to retrieve a subset of digital images for display via a computing device and/or to segment objects portrayed in one or more digital images in accordance with one or more embodiments described herein) installed on the client device 108, such as a VLM debiasing application. In certain instances, the image retrieval application 110 is hosted on the server device(s) 106. Additionally, when hosted on the server device(s) 106, the image retrieval application 110 is accessed by the client device 108 through a web browser and/or another online interfacing platform and/or tool.

As illustrated in FIG. 1, in some embodiments, the VLM debiasing system 102 is hosted by the image retrieval application 110 on the client device 108 (e.g., additionally or alternatively to being hosted by the image retrieval system 104 on the server device(s) 106). For example, the VLM debiasing system 102 performs the protected attribute disentangling techniques described herein on the client device 108. In some implementations, the VLM debiasing system 102 utilizes the server device(s) 106 to train and implement machine learning models (such as the additive residual learner 116). In one or more embodiments, the VLM debiasing system 102 utilizes the server device(s) 106 to train machine learning models (such as the additive residual learner 116) and utilizes the client device 108 to implement or apply the machine learning models.

Further, although FIG. 1 illustrates the VLM debiasing system 102 being implemented by a particular component and/or device within the system 100 (e.g., the server device(s) 106 and/or the client device 108), in some embodiments the VLM debiasing system 102 is implemented, in whole or in part, by other computing devices and/or components in the system 100. For instance, in some embodiments, the VLM debiasing system 102 is implemented on another client device. More specifically, in one or more embodiments, the description of (and acts performed by) the VLM debiasing system 102 are implemented by (or performed by) the image retrieval application 110 on another client device.

In some embodiments, the image retrieval application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., requests for image search results). In response, the VLM debiasing system 102 on the server device(s) 106 performs operations described herein to select one or more digital images and/or segment objects portrayed in one or more digital images. The server device(s) 106 provides the output or results of the operations (e.g., a subset of digital images and/or object segmentations for one or more digital images) to the client device 108. As another example, in some implementations, the VLM debiasing system 102 on the client device 108 performs operations described herein to select one or more digital images and/or segment objects portrayed in one or more digital images. The client device 108 provides the output or results of the operations (e.g., a subset of digital images and/or object segmentations for one or more digital images) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 11. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2:
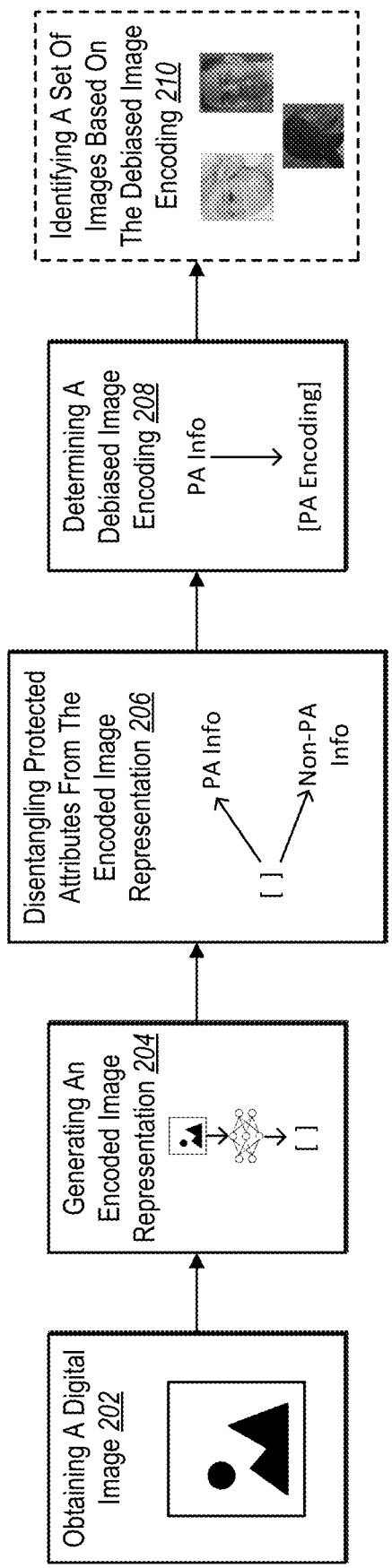
FIG. 2 illustrates the VLM debiasing system disentangling protected attributes from an image encoding and generating a debiased image encoding in accordance with one or more embodiments.

As mentioned above, in some embodiments, the VLM debiasing system 102 extracts additive residuals from image encodings to debias vision-language models. For instance, FIG. 2 illustrates the VLM debiasing system 102 disentangling protected attributes from an image encoding and generating a debiased image encoding in accordance with one or more embodiments. Specifically, FIG. 2 shows a series of acts that the VLM debiasing system 102 performs to generate debiased image encodings and identify images from the debiased image encodings.

To further illustrate, in some embodiments, the VLM debiasing system 102 performs an act 202 for obtaining a digital image. For instance, the VLM debiasing system 102 accesses a database (e.g., stored on the server device(s) 106) comprising a set of digital images. In some implementations, the VLM debiasing system 102 retrieves a digital image of the set of digital images from the database. Alternatively, in some embodiments, the VLM debiasing system 102 captures a digital image (e.g., utilizing a camera of the client device 108). Moreover, in some implementations, the VLM debiasing system 102 receives a digital image (e.g., from the client device 108 or another client device). Furthermore, in some embodiments, the VLM debiasing system 102 generates a digital image (e.g., utilizing an image generation neural network).

Upon obtaining the digital image, in some implementations, the VLM debiasing system 102 performs an act 204 for generating an encoded image representation of the digital image. For example, the VLM debiasing system 102 utilizes an image encoder of the vision-language neural network 114 to process the digital image and generate or extract an encoded representation of details of the digital image. For instance, the VLM debiasing system 102 converts information contained in the digital image from a two-dimensional, three-channel image to a d-dimensional latent vector space.

As further illustrated in FIG. 2, in some embodiments, the VLM debiasing system 102 performs an act 206 for disentangling protected attributes from the encoded image representation of the digital image. For instance, the VLM debiasing system 102 evaluates information encoded within the encoded image representation to determine portions of the information that are specific to one or more protected attributes. In particular, the VLM debiasing system 102 extracts a protected attribute encoding from the encoded image representation of the digital image. For example, the VLM debiasing system 102 utilizes an additive residual learner to disentangle protected-attribute information from non-protected-attribute information encoded within the encoded image representation.

As mentioned, in some implementations, the VLM debiasing system 102 performs an act 208 for determining a debiased image encoding for the digital image. To illustrate, the VLM debiasing system 102 determines or encodes an image encoding that excludes protected-attribute information encoded within the protected attribute encoding. In some embodiments, the VLM debiasing system 102 extracts or removes the protected attribute encoding from the encoded image representation. For instance, the VLM debiasing system 102 generates the protected attribute encoding as a negative attribute encoding such that, when the VLM debiasing system 102 combines the protected attribute encoding and the encoded image representation, the VLM debiasing system 102 effectively removes the protected-attribute information from the encoded image representation to determine the debiased image encoding.

In addition, in some embodiments, the VLM debiasing system 102 performs an act 210 for identifying a set of images based on the debiased image encoding for the digital image. For example, as described further below, the VLM debiasing system 102 analyzes the debiased image encoding to determine whether the debiased image encoding corresponds to a text query (e.g., by comparing the debiased image encoding with a text query encoding). In some cases, the VLM debiasing system 102 selects the digital image for display via a client device. For instance, the VLM debiasing system 102 selects the image for display based on the debiased image encoding satisfying a similarity threshold.

To further illustrate, upon determining that the debiased image encoding corresponds to the text query, the VLM debiasing system 102 includes the digital image represented by the debiased image encoding within the set of images. In some implementations, the VLM debiasing system 102 undertakes the above-described process for additional digital images. For instance, the VLM debiasing system 102 generates an additional encoded image representation of an additional digital image utilizing the image encoder of the vision-language neural network 114. The VLM debiasing system 102 extracts an additional protected attribute encoding from the additional encoded image representation, utilizing the additive residual learner. With the additional protected attribute encoding, the VLM debiasing system 102 determines an additional debiased imaged encoding for the additional digital image by combining the additional protected attribute encoding and the additional encoded image representation. For those additional images that have debiased image encodings that correspond to the text query, the VLM debiasing system 102 includes those images in the set.

To illustrate further, in some implementations, the VLM debiasing system 102 analyzes a plurality (or set) of digital images. For each digital image in the plurality of digital images, the VLM debiasing system 102 determines a debiased image encoding. The VLM debiasing system 102 evaluates each debiased image encoding to determine correspondence with the text query. In some cases, the VLM debiasing system 102 identifies a set (or subset) of digital images within the plurality of digital images that correspond to the text query. In some embodiments, the VLM debiasing system 102 provides the set of images for display via a client device. Alternatively, or additionally, in some implementations, the VLM debiasing system 102 generates object segmentations for the set of images to identify portions of the images that more particularly correspond with the text query.

Figure 3:
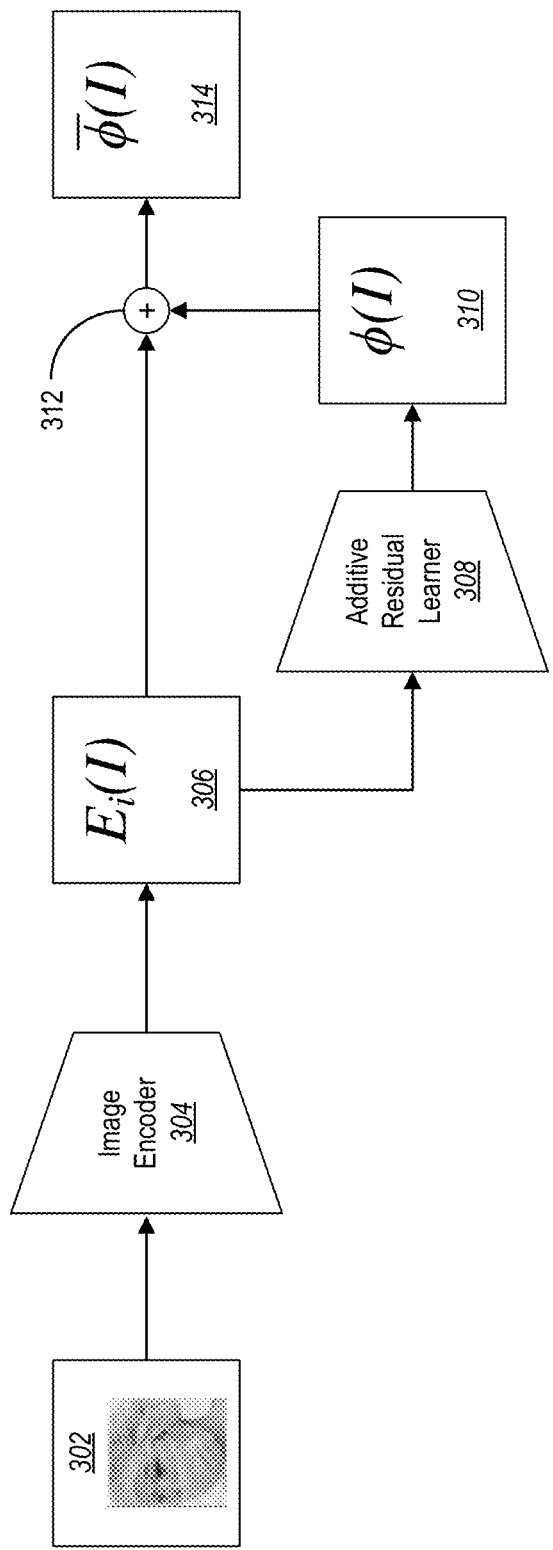
FIG. 3 illustrates the VLM debiasing system utilizing an additive residual to determine a debiased image encoding in accordance with one or more embodiments.

As mentioned above, in some embodiments, the VLM debiasing system 102 determines a debiased image encoding for a digital image. For instance, FIG. 3 illustrates the VLM debiasing system 102 utilizing an additive residual to determine a debiased image encoding in accordance with one or more embodiments. Specifically, FIG. 3 shows a diagram of neural networks and operations used by the VLM debiasing system 102 for generating a debiased image encoding.

As illustrated in FIG. 3, in some embodiments, the VLM debiasing system 102 processes a digital image 302 through an image encoder 304 to generate an encoded image representation 306. In some cases, an image encoder includes a component of a vision-language model that encodes or converts an image to a latent feature vector representation for the image. For instance, an image encoder converts image data in a two-dimensional, three-channel image matrix to a d-dimensional vector numerical representation. In certain embodiments, a vision-language model includes a machine-learning model (e.g., a deep neural network) designed to associate images with text sequences. For example, a vision-language model converts both a digital image and a text sequence into latent feature vector representations that are comparable with each other (e.g., within a common latent space). In some embodiments, a vision-language model is a vision-language neural network, such as the vision-language neural network 114.

In one or more embodiments, a machine-learning model includes a computer representation that is tunable (e.g., trained) based on inputs to approximate unknown functions used for generating the corresponding outputs. In particular, a machine-learning model includes a computer-implemented model that utilizes algorithms to learn from, and make predictions on, known data by analyzing the known data to learn to generate outputs that reflect patterns and attributes of the known data. For instance, a machine-learning model includes, but is not limited to a neural network (e.g., a convolutional neural network, recurrent neural network, or other deep learning network), a decision tree (e.g., a gradient boosted decision tree), association rule learning, inductive logic programming, support vector learning, Bayesian network, regression-based model (e.g., censored regression), principal component analysis, or a combination thereof.

Similarly, a neural network includes a machine-learning model of interconnected artificial neurons (e.g., organized in layers) that communicate and learn to approximate complex functions and generate outputs. In some cases, a neural network refers to an algorithm (or set of algorithms) that implements deep learning techniques to model high-level abstractions in data. For example, a neural network includes a convolutional neural network, a recurrent neural network (e.g., an LSTM), a graph neural network, or a generative adversarial neural network. For example, in some implementations, a single-layer neural network is a neural network having only one layer of artificial neurons. In some embodiments, a single-layer neural network is a single layer of a larger neural network.

To illustrate, in some implementations, the image encoder 304 is a component of the vision-language neural network 114. For example, in some embodiments, the image encoder 304 is a convolutional neural network. In some implementations, the image encoder 304 is a transformer-based machine-learning model, such as a vision transformer. The VLM debiasing system 102 utilizes the image encoder 304 to generate the encoded image representation 306 by encoding the digital image 302.

In some embodiments, an encoded image representation (or image encoding) includes a numerical representation of features of an image (e.g., features and/or pixels of a digital image). For instance, an encoded image representation includes a feature map or feature vector representation of a digital image. To illustrate, an encoded image representation includes a latent feature vector representation of a digital image generated by one or more layers of a neural network, such as the image encoder 304 of the vision-language neural network 114.

As also mentioned, in some embodiments, the VLM debiasing system 102 processes the encoded image representation 306 through the additive residual learner 308 to extract the protected attribute encoding 310. In some cases, an additive residual learner includes a machine-learning model or a portion (e.g., one or more layers) of a machine-learning model that identifies protected-attribute information in an image encoding. To illustrate, an additive residual learner includes a portion of a neural network (such as a single-layer neural network) that determines protected-attribute information in an encoded image representation. For example, an additive residual learner disentangles protected-attribute information from non-protected-attribute information in the encoded image representation to generate a protected attribute encoding of the digital image. In some embodiments, the VLM debiasing system 102 extracts the protected attribute encoding 310 from the encoded image representation 306 by processing the encoded image representation 306 through a single-layer neural network to disentangle protected-attribute information from non-protected-attribute information encoded within the encoded image representation 306.

In some embodiments, the architecture of the additive residual learner 308 matches the final layer of the image encoder 304. For example, in cases in which the image encoder 304 has an activation layer as its final layer, the VLM debiasing system 102 utilizes an activation layer as the additive residual learner 308. As another example, in cases in which the image encoder 304 has a batch normalization layer as its final layer, the VLM debiasing system 102 utilizes a batch normalization layer as the additive residual learner 308.

In one or more embodiments, a protected attribute includes a characteristic of a subject portrayed in a digital image. For instance, a protected attribute includes any characteristic of a person or group of people that is associated with a collective identity. To illustrate, a protected attribute includes a visually discernible protected attribute, such as a visible characteristic by which a person can be labeled as belonging to a particular identity group with a corresponding protected label. For example, a protected attribute includes a person's race, ethnicity, age, gender, and/or other physically identifiable characteristic.

In some embodiments, protected-attribute information includes information contained in an image encoding that indicates one or more protected attributes of a subject of an image. For example, protected-attribute information includes (information encoded by) latent features in an encoded image representation that denote a person's race, gender, age, etc. In some cases, non-protected-attribute information includes information contained in an image encoding that does not indicate one or more protected attributes of a subject of an image. Moreover, non-protected-attribute information also includes information contained in an image encoding that has a reduced level of indication of a subject's protected attributes. For example, non-protected-attribute information includes information that remains in an image encoding after some (but not necessarily all) protected-attribute information has been removed from the image encoding.

In one or more embodiments, a protected attribute encoding includes an image encoding that comprises protected-attribute information. For example, a protected attribute encoding includes a portion of the encoded image representation that consists of protected-attribute information. For instance, a protected attribute encoding includes a latent feature vector that specifically highlights protected-attribute information. In some embodiments, a protected attribute encoding is a sparse feature vector, in which non-zero elements denote protected-attribute information. In some implementations, a protected attribute encoding is a negative attribute encoding, meaning that the elements of the protected attribute encoding are a negative value of corresponding elements in the encoded image representation.

As further illustrated in FIG. 3, in some embodiments, the VLM debiasing system 102 combines the protected attribute encoding 310 with the encoded image representation 306. For example, the VLM debiasing system 102 utilizes a combination operation 312 (e.g., a summation operation) to combine the protected attribute encoding 310 and the encoded image representation 306, thereby determining a debiased image encoding 314 for the digital image 302. In some embodiments, a debiased image encoding includes an image encoding that comprises non-protected-attribute information. For example, a debiased image encoding includes a portion of the encoded image representation that consists of non-protected-attribute information. For instance, a debiased image encoding includes a latent feature vector that does not indicate protected attributes, or that has a reduced indication of protected attributes (reduced relative to the encoded image representation). In some embodiments, the VLM debiasing system 102 determines the debiased image encoding 314 by determining an image encoding that excludes protected-attribute information encoded within the protected attribute encoding 310.

As mentioned, in some implementations, the VLM debiasing system 102 generates the protected attribute encoding 310 as a negative attribute encoding. Thus, the combination operation 312, in some implementations, is a summation of the encoded image representation 306 and the protected attribute encoding 310. For instance, the VLM debiasing system 102 combines the protected attribute encoding 310 and the encoded image representation 306 by adding the protected attribute encoding 310 (a negative attribute encoding) to the encoded image representation 306 to remove protected-attribute information from the encoded image representation 306 (e.g., effectively subtracting the protected attribute encoding 310 from the encoded image representation 306).

In some embodiments, the VLM debiasing system 102 generates the protected attribute encoding 310 as a positive attribute encoding (e.g., without assigning a negative value to the protected-attribute information). Thus, the combination operation 312, in some embodiments, is a subtraction operation. For instance, the VLM debiasing system 102 combines the protected attribute encoding 310 and the encoded image representation 306 by subtracting the protected attribute encoding 310 from the encoded image representation 306 to remove protected-attribute information from the encoded image representation 306.

As discussed, the VLM debiasing system 102 generates the debiased image encoding 314 for the digital image 302. As described in further detail below, the VLM debiasing system 102, in some embodiments, utilizes the debiased image encoding 314 to determine whether the digital image 302 corresponds with a text sequence (e.g., for a text query). By utilizing the debiased image encoding 314 (e.g., in place of the encoded image representation 306), the VLM debiasing system 102 can improve the fairness of image search results and/or object segmentation for images by decreasing the extent of protected-attribute information influencing the outputs of the search results and/or the segmentation. In this way, the VLM debiasing system 102 can debias vision-language models.

The techniques described above in connection with FIG. 3 can be represented symbolically. For example, as described herein, the digital image 302 is represented as I, where $I \in \mathbb{R}^{3 \times m \times n}$ (a three-channel, two-dimensional image matrix), and the encoded image representation 306 of the digital image 302 is represented as $E_i(I)$, where $E_i \in \mathbb{R}^d$ (a vector in d-dimensional latent space). Additionally, the protected attribute encoding 310 is represented as $\phi(I)$ and the debiased image encoding 314 is represented as $\bar{\phi}(I)$. The protected attribute encoding 310 and the debiased image encoding 314 are additive components of the encoded image representation 306, as follows:

$$E_i(I) = \bar{\phi}(I) + \phi(I)$$

The additive residual learner 308 produces an output (an operation on the encoded image representation 306) that can be represented symbolically as $R(\cdot)$. Thus, the debiased image encoding 314 can be recast as follows:

$$\bar{\phi}(I) = E_i(I) - R(E_i(I))$$

Figure 4A:
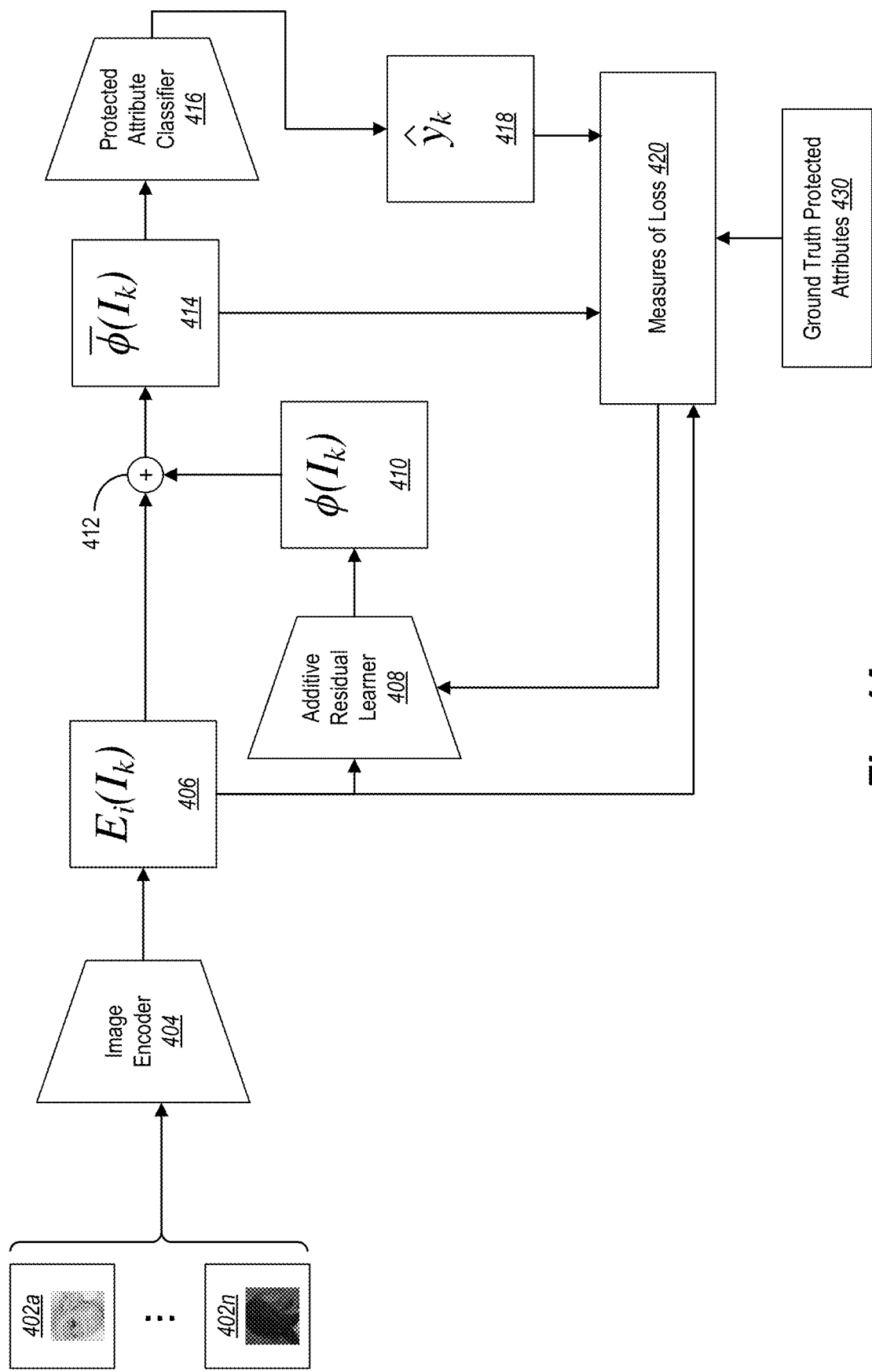
FIG. 4A illustrates the VLM debiasing system training the additive residual learner in accordance with one or more embodiments.
Figure 4B:
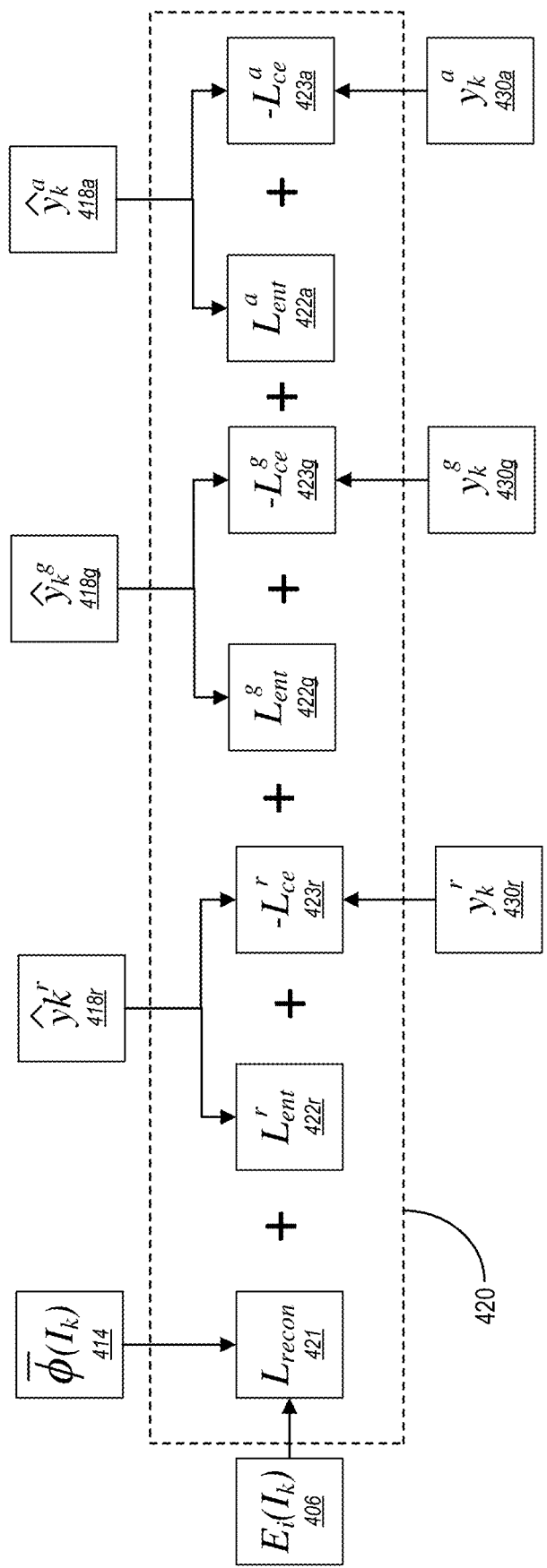
FIG. 4B illustrates the VLM debiasing system determining measures of loss in accordance with one or more embodiments.

As discussed above, in some embodiments, the VLM debiasing system 102 trains the additive residual learner. For instance, FIG. 4A illustrates a training diagram whereby the VLM debiasing system 102 updates parameters of an additive residual learner based on one or more measures of loss in accordance with one or more embodiments. Thereafter, FIG. 4B provides additional detail regarding the specific measures of loss involved in training an additive residual learner. As just mentioned, FIG. 4A shows a diagram of neural networks and operations that the VLM debiasing system 102 uses as part of the training process.

Similar to the description above in relation to FIG. 3, FIG. 4A illustrates the VLM debiasing system 102 generating a debiased image encoding 414 for a digital image. More particularly, as illustrated in FIG. 4A, the VLM debiasing system 102 obtains or accesses a set of digital images 402a-402n (e.g., a sample set or a training set of images) to use as a basis for training an additive residual learner 408. From an image within the set of digital images 402a-402n, the VLM debiasing system 102 extracts or generates an encoded image representation 406 utilizing an image encoder 404, in line with the description of FIG. 3 above. In addition, the VLM debiasing system 102 extracts a protected attribute encoding 410 from the encoded image representation 406 utilizing the additive residual learner 408 and combines the protected attribute encoding 410 with the encoded image representation 406 to generate the debiased image encoding 414 for the digital image. As mentioned, in some embodiments, the image encoder 404, the encoded image representation 406, the additive residual learner 408, the protected attribute encoding 410, and the debiased image encoding 414 are the same as or similar to, respectively, the image encoder 304, the encoded image representation 306, the additive residual learner 308, the protected attribute encoding 310, and the debiased image encoding 314 as described above in connection with FIG. 3.

As further illustrated, as part of the training process, FIG. 4A shows the VLM debiasing system 102 utilizing a protected attribute classifier 416 to generate one or more protected attribute predictions 418. Specifically, the VLM debiasing system 102 generates the protected attribute predictions 418 in the form of probabilities or binary indicators whether the digital image reflects respective protected attributes (e.g., based on the debiased image encoding 414). As further shown in FIG. 4A, the VLM debiasing system 102 determines measures of loss 420 associated with the protected attribute predictions 418 and/or associated with the debiased image encoding 414 and the encoded image representation 406. Based on the measures of loss 420, in some embodiments, the VLM debiasing system 102 tunes parameters of the additive residual learner 408, thereby training the additive residual learner 408 to extract protected attribute encodings (e.g., to reduce the measures of loss).

As mentioned, in some implementations, the VLM debiasing system 102 utilizes the protected attribute classifier 416 to generate the one or more protected attribute predictions 418. In some embodiments, a protected attribute classifier includes a machine-learning model trained to identify and classify protected attributes of subjects portrayed in images based on image encodings for the images. To illustrate, a protected attribute classifier includes a neural network trained to analyze image encodings, including debiased image encodings, and to predict protected-attribute information contained within the source digital images for those image encodings. Relatedly, a protected attribute prediction includes an output from a protected attribute classifier. For instance, a protected attribute prediction includes a prediction (e.g., a binary indication or probability of presence) of one or more protected attributes of subjects portrayed in a digital image. In some embodiments, the protected attribute classifier 416 is pre-trained to generate the protected attribute predictions 418. For example, in some embodiments, the parameters of the protected attribute classifier 416 are frozen during training of the additive residual learner 408.

To further illustrate, in some embodiments, the VLM debiasing system 102 pre-trains the protected attribute classifier 416 to predict protected-attribute information from debiased image encodings. For example, in some implementations, the VLM debiasing system 102 separately trains the protected attribute classifier 416 from the additive residual learner 408 by processing image encodings from the image encoder 404 through the protected attribute classifier 416. In some cases, the VLM debiasing system 102 tunes parameters of the protected attribute classifier 416 utilizing one or more measures of loss based on protected attribute predictions of the protected attribute classifier 416. For example, the VLM debiasing system 102 supplies image encodings with gradients of changing representations to the protected attribute classifier 416 and utilizes the protected attribute classifier 416 to generate protected attribute predictions based on the image encodings. In some embodiments, the protected attribute classifier 416 has a single linear layer (d×256) with ReLU activation, followed by multiple linear classification projection heads (256×128) with ReLU, and a linear layer to produce logits with output sizes determined by the number of protected attribute labels in the training dataset. In some implementations, the VLM debiasing system 102 utilizes cross-entropy losses for the one or more measures of loss to train the protected attribute classifier 416.

As mentioned, in some implementations, during training of the additive residual learner 408, the VLM debiasing system 102 utilizes the protected attribute classifier 416 to generate, from the debiased image encoding 414, predictions of what protected attributes are portrayed in a digital image of the set of digital images 402a-402n. An objective of training the additive residual learner 408 is for the additive residual learner 408 to successfully identify protected-attribute information from image encodings, so that the protected-attribute information can be removed from the image encodings. Thus, as described further below, in some embodiments, the VLM debiasing system 102 seeks to maximize (or increase) a classification loss of the protected attribute classifier 416.

As illustrated in FIG. 4A, in some embodiments, the VLM debiasing system 102 utilizes the protected attribute classifier 416 to generate the one or more protected attribute predictions 418. In some cases, the one or more protected attribute predictions 418 include predictions about (e.g., binary indications or probabilities of depicting) a subject's race, ethnicity, gender, and/or age. For example, the VLM debiasing system 102 utilizes the protected attribute classifier 416 to generate predictions for whether an image subject is male or female, old or young, and/or Black, White, Indian, East Asian, Southeast Asian, Middle Eastern, or Latino. In some cases, an image portrays multiple people, and the VLM debiasing system 102 utilizes the protected attribute classifier 416 to generate predictions for one or more protected attributes for each person portrayed in the image.

As mentioned, in some implementations, the VLM debiasing system 102 generates one or more measures of loss 420. As described further below in connection with FIG. 4B, the VLM debiasing system 102 determines the measures of loss 420 based on some or all of the protected attribute predictions 418, ground truth protected attributes 430, the encoded image representation 406, and the debiased image encoding 414. In some embodiments, the VLM debiasing system 102 utilizes the measures of loss 420 to train the additive residual learner 408. For example, the VLM debiasing system 102 tunes parameters of the additive residual learner 408 to reduce the measures of loss 420 (e.g., below a threshold measure of loss). In some cases, a ground truth protected attribute includes an actual protected attribute of a subject portrayed in an image. For instance, a ground truth protected attribute includes an image subject's protected attribute independent of an image encoding for the image.

As just mentioned, in some embodiments, the VLM debiasing system 102 generates a variety of losses to train the additive residual learner 408. For instance, FIG. 4B illustrates the VLM debiasing system 102 determining multiple measures of loss in accordance with one or more embodiments. Specifically, FIG. 4B shows the measures of loss 420 comprising a reconstruction loss 421, one or more entropy losses (depicted as entropy losses 422r, 422g, and 422a), and one or more cross-entropy losses (depicted as cross-entropy losses 423r, 423g, and 423a).

In some embodiments, a reconstruction loss includes a measure of how close a debiased image encoding is to its corresponding encoded image representation. For example, a reconstruction loss includes a norm of a difference of the encoded image representation and the debiased image encoding. An entropy loss includes a measure of uncertainty of a protected attribute prediction. For example, an entropy loss includes a maximum softmax of a probability distribution for a protected attribute prediction. A cross-entropy loss includes a measure of how close a protected attribute prediction is to its corresponding ground truth protected attribute. For example, a cross-entropy loss includes a binary cross-entropy loss (e.g., with respect to gender). As another example, a cross-entropy loss includes a categorical cross-entropy loss (e.g., with respect to race or ethnicity).

As shown in FIG. 4B, the VLM debiasing system 102 determines a reconstruction loss 421 based on the encoded image representation 406 and the debiased image encoding 414. For instance, the VLM debiasing system 102 compares the debiased image encoding 414 with the encoded image representation 406 to determine a measure of similarity or dissimilarity between these two image encodings. For example, the VLM debiasing system 102 computes a norm of a difference between the encoded image representation 406 and the debiased image encoding 414. In some embodiments, the VLM debiasing system 102 determines an L2 norm of the difference between the encoded image representation 406 and the debiased image encoding 414.

In some implementations, the VLM debiasing system 102 seeks to minimize (or reduce) the reconstruction loss 421 to improve a zero-shot performance of the vision-language neural network 114. For example, by reducing the amount of information disentangled and removed from the image encodings, the VLM debiasing system 102 reduces negative effects of removing information from the image encodings on the ability of the vision-language neural network 114 to match images with text sequences.

As further shown in FIG. 4B, the VLM debiasing system 102 determines one or more entropy losses based on the one or more protected attribute predictions 418. For instance, in some embodiments, the VLM debiasing system 102 determines an entropy loss 422r for a race classifier head of the protected attribute classifier 416. Indeed, the VLM debiasing system 102 determines the entropy loss 422r based on a protected attribute prediction 418r of a subject's race portrayed in the digital image. Similarly, in some embodiments, the VLM debiasing system 102 determines an entropy loss 422g for a gender classifier head of the protected attribute classifier 416, based on a protected attribute prediction 418g of a subject's gender portrayed in the digital image. Likewise, the VLM debiasing system 102 determines an entropy loss 422a for an age classifier head of the protected attribute classifier 416, based on a protected attribute prediction 418a of a subject's age portrayed in the digital image.

For example, the VLM debiasing system 102 determines the entropy losses 422r, 422g, 422a by determining a probability distribution for each type of protected attribute prediction made by the protected attribute classifier 416. To illustrate, the VLM debiasing system 102 determines the entropy loss 422r corresponding to the race classifier head of the protected attribute classifier 416 by determining a probability distribution of the protected attribute predictions 418r and operating on the probability distribution with a softmax function. In some implementations, the VLM debiasing system 102 selects a maximum value of the output of the softmax function as the entropy loss.

As further shown in FIG. 4B, as part of the measures of loss 420, the VLM debiasing system 102 determines one or more cross-entropy losses based on the one or more protected attribute predictions 418 and the ground truth protected attributes 430. For instance, in some embodiments, the VLM debiasing system 102 determines a cross-entropy loss 423r for a race classifier head of the protected attribute classifier 416. Particularly, the VLM debiasing system 102 determines the cross-entropy loss 423r by comparing a protected attribute prediction 418r of a subject's race portrayed in the digital image with a ground truth protected attribute 430r of the subject's race. Similarly, in some embodiments, the VLM debiasing system 102 determines a cross-entropy loss 423g for a gender classifier head of the protected attribute classifier 416, based on a protected attribute prediction 418g of a subject's gender portrayed in the digital image and a ground truth protected attribute 430g of the subject's gender. Likewise, the VLM debiasing system 102 determines a cross-entropy loss 423a for an age classifier head of the protected attribute classifier 416, based on a protected attribute prediction 418a of a subject's age portrayed in the digital image and a ground truth protected attribute 430a of the subject's age.

For example, the VLM debiasing system 102 determines the cross-entropy losses 423r, 423g, 423a by comparing the protected attribute predictions 418r, 418g, and 418a with their respective ground truth protected attributes 430r, 430g, and 430a. To illustrate, the VLM debiasing system 102 determines the cross-entropy loss 423r corresponding to the race classifier head of the protected attribute classifier 416 by determining a probability distribution of the protected attribute predictions 418r and comparing them with a probability distribution of the ground truth protected attributes 430r. For instance, the VLM debiasing system 102 determines a cross-entropy of the protected attribute predictions from the ground truth protected attributes.

In some implementations, the VLM debiasing system 102 utilizes a negative of the cross-entropy as the cross-entropy loss. Thus, the VLM debiasing system 102 seeks to jointly minimize (or reduce) the negative cross-entropy losses for race, gender, and/or age by maximizing (or increasing) the respective measures of cross-entropy. By increasing the cross-entropy, in some implementations, the VLM debiasing system 102 increases the misclassification of protected attributes by the protected attribute classifier 416, thereby improving the extent to which protected attributes are disentangled and removed from the image encodings.

Furthermore, by combining an entropy loss and a cross-entropy loss in the overall loss function for the additive residual learner 408, the VLM debiasing system 102 offsets tendencies of the protected attribute classifier 416 to merely flip protected attribute predictions from one label to another label within the protected attribute category.

The measures of loss 420 can be represented symbolically. For example, in some embodiments, the reconstruction loss 421 is represented as follows:

$$L_{recon} = \|E_i(I) - \bar{\phi}(I)\|_2$$

Moreover, in some embodiments, the entropy losses are represented generally as follows:

$$L_{ent}^x = \max(\sigma_{softmax}(\hat{y}_x))$$

where x is a placeholder for any protected attribute (e.g., r for race, g for gender, and a for age), and where $\hat{y}_x$ is a protected attribute prediction for the corresponding protected attribute.

Furthermore, in some embodiments, the cross-entropy losses are represented generally as follows:

$$L_{ce}^x = L_{ce}^x(y_x, \hat{y}_x)$$

where $y_x$ is the ground truth protected attribute for the corresponding protected attribute.

As described, in some implementations, the VLM debiasing system 102 trains the additive residual learner 408 utilizing a composite loss function comprising multiple objectives. In some embodiments, the composite loss function is represented as follows:

$$L_{ARL} = $$
$$w_{recon} \cdot L_{recon} + w_{ent} \cdot (L_{ent}^r + L_{ent}^g + L_{ent}^a) - (w_{ce}^r \cdot L_{ce}^r + w_{ce}^g \cdot L_{ce}^g + w_{ce}^a \cdot L_{ce}^a)$$

where the several terms w are respective weights for the component objectives in the composite loss function. As mentioned, in some embodiments, the VLM debiasing system 102 determines additional protected attributes (e.g., ethnicity) and corresponding additional entropy and cross-entropy losses for the composite loss function (e.g., $L_{ent}^{ethnicity}$ and $L_{ce}^{ethnicity}$).

As mentioned above, in some embodiments, the VLM debiasing system 102 trains the protected attribute classifier 416 before training the additive residual learner 408. As also mentioned, in some implementations, the VLM debiasing system 102 utilizes one or more cross-entropy losses in a loss function for training the protected attribute classifier 416. In some embodiments, the loss function for the protected attribute classifier 416 is represented as follows:

$$L_{PAC} = L_{ce}^r(y^r, \hat{y}^r) + L_{ce}^g(y^g, \hat{y}^g) + L_{ce}^a(y^a, \hat{y}^a)$$

where $y^x$ is the ground truth protected attribute for the corresponding protected attribute and where $\hat{y}^x$ is the protected attribute prediction for the corresponding protected attribute.

Figure 5:
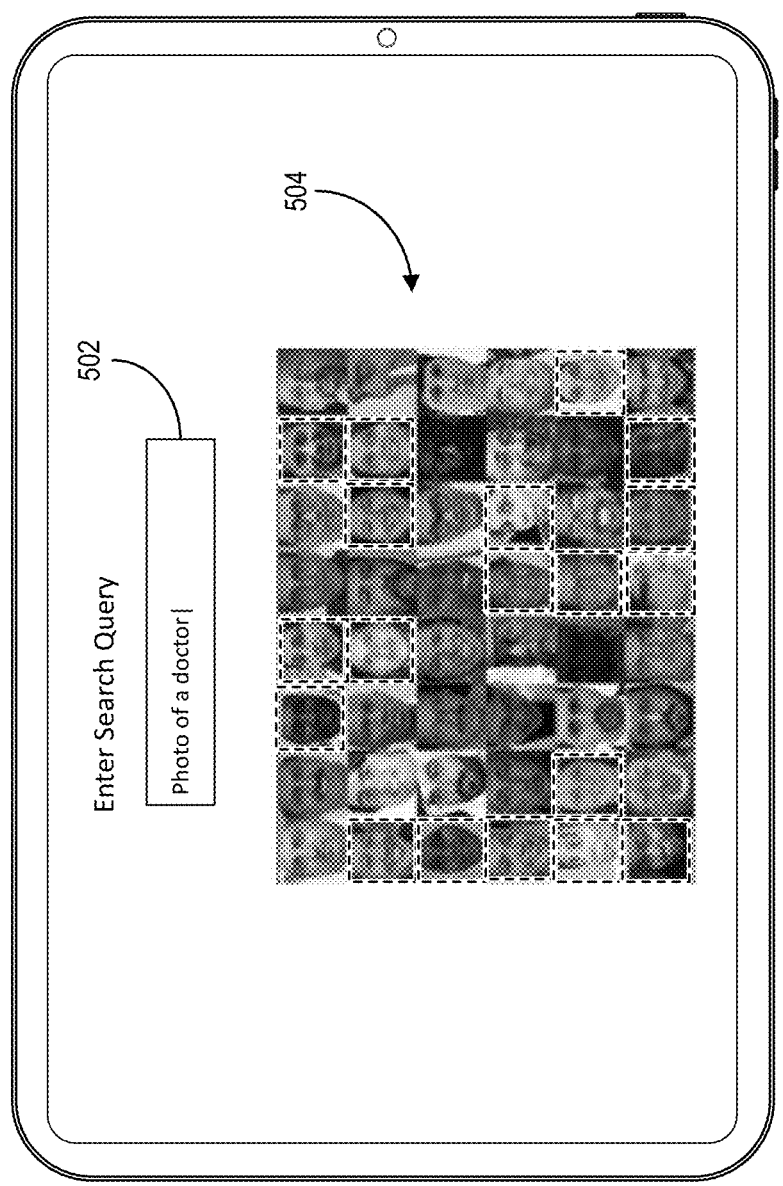
FIG. 5 illustrates the VLM debiasing system selecting digital images for display via a client device based on the digital images corresponding to a text query in accordance with one or more embodiments.

As discussed above, in some embodiments, the VLM debiasing system 102 selects one or more digital images for display via a client device, based on the one or more digital images corresponding to a text query. For instance, FIG. 5 illustrates the VLM debiasing system 102 displaying a subset of digital images that correspond to a text query from a set of digital images in accordance with one or more embodiments. Specifically, FIG. 5 shows a text query 502 comprising a text sequence "Photo of a doctor" as a search query, and a set of images 504. In response to receiving the text query 502, in some embodiments, the VLM debiasing system 102 determines a subset of images from the set of images 504 that correspond with the text query 502. For instance, the VLM debiasing system 102 identifies a subset of images that likely (e.g., with at least a threshold probability) depict a doctor.

To illustrate further, in some embodiments, the VLM debiasing system 102 receives the text query 502 ("Photo of a doctor") comprising a text sequence for searching a database of digital images. To generate the set of images 504 for the text query 502, the VLM debiasing system 102 generates and compares a text embedding and image embeddings. For instance, the VLM debiasing system 102 generates an encoded text representation for the text sequence "Photo of a doctor." In some cases, a text query includes a request for image search or image segmentation based on a semantic text sequence. For example, a text query includes a linguistic input to retrieve images that correspond with the linguistic input. Relatedly, a text sequence includes a string of text characters that make up a text query. In some cases, a text sequence is associated with a digital image. For example, a text sequence is associated with a digital image when the VLM debiasing system 102 compares the text sequence with the digital image.

In some embodiments, the VLM debiasing system 102 utilizes a text encoder of a vision-language model to generate an encoded text representation. For example, the VLM debiasing system 102 processes the text sequence of the text query 502 through a text encoder of the vision-language neural network 114 to generate an encoded text representation for the text sequence. A text encoder includes a component of a vision-language model that converts a text sequence to a latent feature vector representation for the text sequence. For instance, a text encoder converts text tokens to a d-dimensional vector numerical representation. An encoded text representation (or text encoding) includes a numerical representation of features of a text sequence (e.g., features suggesting a connotation or meaning). For instance, an encoded text representation includes a feature vector representation of a text sequence. To illustrate, an encoded text representation includes a latent feature vector representation of a text query generated by one or more layers of a neural network, such as the text encoder of the vision-language neural network 114.

Having generated the encoded text representation, in some implementations, the VLM debiasing system 102 determines a comparison metric between the encoded text representation and the debiased image encoding. For instance, the VLM debiasing system 102 determines a cosine similarity between the debiased image encoding and the encoded text representation. A cosine similarity includes a measure of how close two representations are in a similar latent space. For instance, in some implementations, the text sequence is represented symbolically as T, the encoded text representation of the text sequence is represented as $E_t(T)$, where $E_t \in \mathbb{R}^d$ (a vector in d-dimensional latent space), and the cosine similarity is represented as follows:

$$Sim_E(I, T) = \frac{E_i(I) \cdot E_t(T)^\top}{\|E_i(I)\| \|E_t(T)\|}$$

As just mentioned, in some embodiments, the VLM debiasing system 102 determines a cosine similarity between a debiased image encoding and an encoded text representation. In some implementations, the VLM debiasing system 102 determines that the cosine similarity (or other comparison metric) satisfies a similarity threshold. To illustrate, the VLM debiasing system 102 compares the cosine similarity to a predetermined value ε. If the cosine similarity is greater than or equal to the predetermined value ε, then the cosine similarity satisfies the similarity threshold. Based on the cosine similarity satisfying the similarity threshold (e.g., the cosine similarity is greater than or equal to the predetermined value), in some implementations, the VLM debiasing system 102 selects the digital image (corresponding to the debiased image encoding) for display via the client device. For example, the VLM debiasing system 102 selects the digital image from a set of candidate images, and includes the image in a subset of images for display on a graphical user interface of the client device.

In some cases, the VLM debiasing system 102 selects one or more images to include within the set of images 504 for display via the client device based on their one or more debiased image encodings satisfying the similarity threshold. Alternatively, in some embodiments, the VLM debiasing system 102 omits one or more images from selection for display via the client device. For instance, the VLM debiasing system 102 omits a digital image from a subset of digital images for display, based on the debiased image encoding of the digital image failing the similarity threshold (e.g., the cosine similarity is less than the predetermined value).

Figure 6:
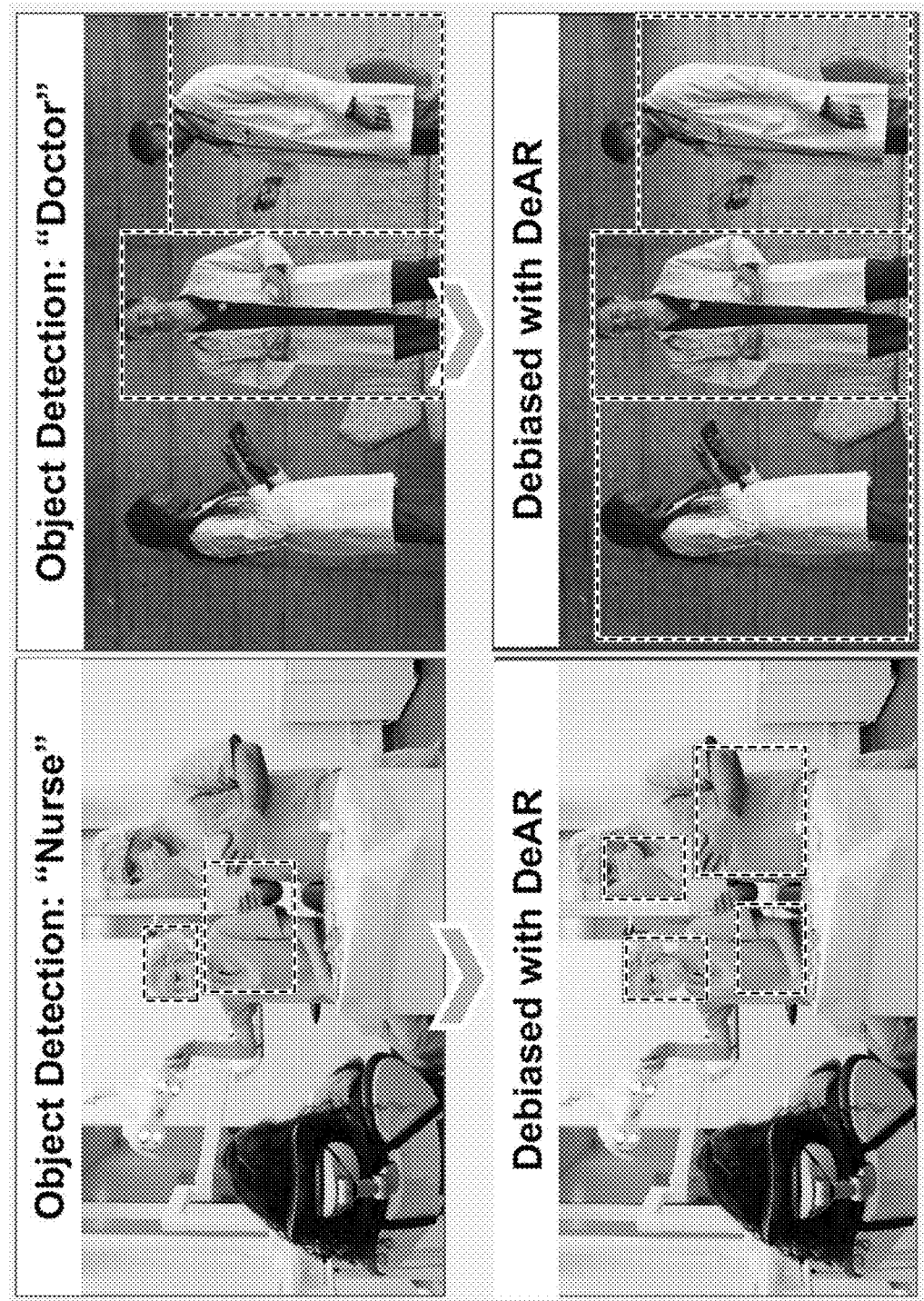
FIG. 6 illustrates comparisons of object detection outputs produced by a conventional system with object detection outputs of the VLM debiasing system in accordance with one or more embodiments.

As mentioned above, in some embodiments, the VLM debiasing system 102 identifies and segments objects portrayed in digital images. For instance, FIG. 6 illustrates comparisons of object detection results produced by a conventional system with outputs of the VLM debiasing system 102, in accordance with one or more embodiments. Specifically, FIG. 6 shows two images, each duplicated for comparison of the VLM debiasing system 102 with the conventional system.

To illustrate, the top-left image of FIG. 6 shows an output of a conventional system based on a text query "nurse." As depicted the conventional system segmented a female medical worker in an operating room, without also segmenting a male medical worker. This is an example of inclusion bias in the conventional system. In particular, the conventional system is biased by disproportionately retrieving image results for the text query "nurse" that include women but not men.

In contrast, the bottom-left image of FIG. 6 shows an output of the VLM debiasing system 102 ("DeAR") for the same image and based on the same text query "nurse." As depicted, the VLM debiasing system 102 segmented both the female medical worker and the male medical worker (e.g., as candidate nurses in the image). Thus, in some embodiments, the VLM debiasing system 102 reduces inclusion bias of the underlying vision-language model by including both women and men as plausible candidates for a characteristic (in this case, the profession of nurse).

Similarly, the top-right image of FIG. 6 shows an output of a conventional system based on a text query "doctor." As depicted the conventional system segmented two male medical workers in a conference, without also segmenting a female medical worker. This is an example of exclusion bias in the conventional system. In particular, the conventional system is biased by disproportionately retrieving image results for the text query "doctor" that include men but not women.

By contrast, the bottom-right image of FIG. 6 shows an output of the VLM debiasing system 102 for the same image and based on the same text query "doctor." As depicted, the VLM debiasing system 102 segmented the female medical worker as well as the male medical workers (e.g., as candidate doctors in the image). Thus, in some embodiments, the VLM debiasing system 102 reduces exclusion bias of the underlying vision-language model by including both women and men as plausible candidates for a characteristic (in this case, the profession of doctor).

Similar to selecting images for display via a client device as described above, in some implementations, the VLM debiasing system 102 generates image segmentations based on a comparison metric, such as the cosine similarity. For instance, the VLM debiasing system 102 determines a cosine similarity between the debiased image encoding and the encoded text representation for an image. In some implementations, the VLM debiasing system 102 determines that the cosine similarity (or other comparison metric) satisfies a similarity threshold. To illustrate, the VLM debiasing system 102 compares the cosine similarity to a predetermined value ε. If the cosine similarity is greater than or equal to the predetermined value ε, then the cosine similarity satisfies the similarity threshold. Based on the cosine similarity satisfying the similarity threshold (e.g., the cosine similarity is greater than or equal to the predetermined value), in some implementations, the VLM debiasing system 102 detects an object (e.g., an image subject, such as a person) portrayed in the image that corresponds to the text query. In some cases, the VLM debiasing system 102 generates a segmentation for the object. For example, the VLM debiasing system 102 generates one or more instance segmentations for one or more objects and displays the one or more instance segmentations via a client device.

Figure 7:
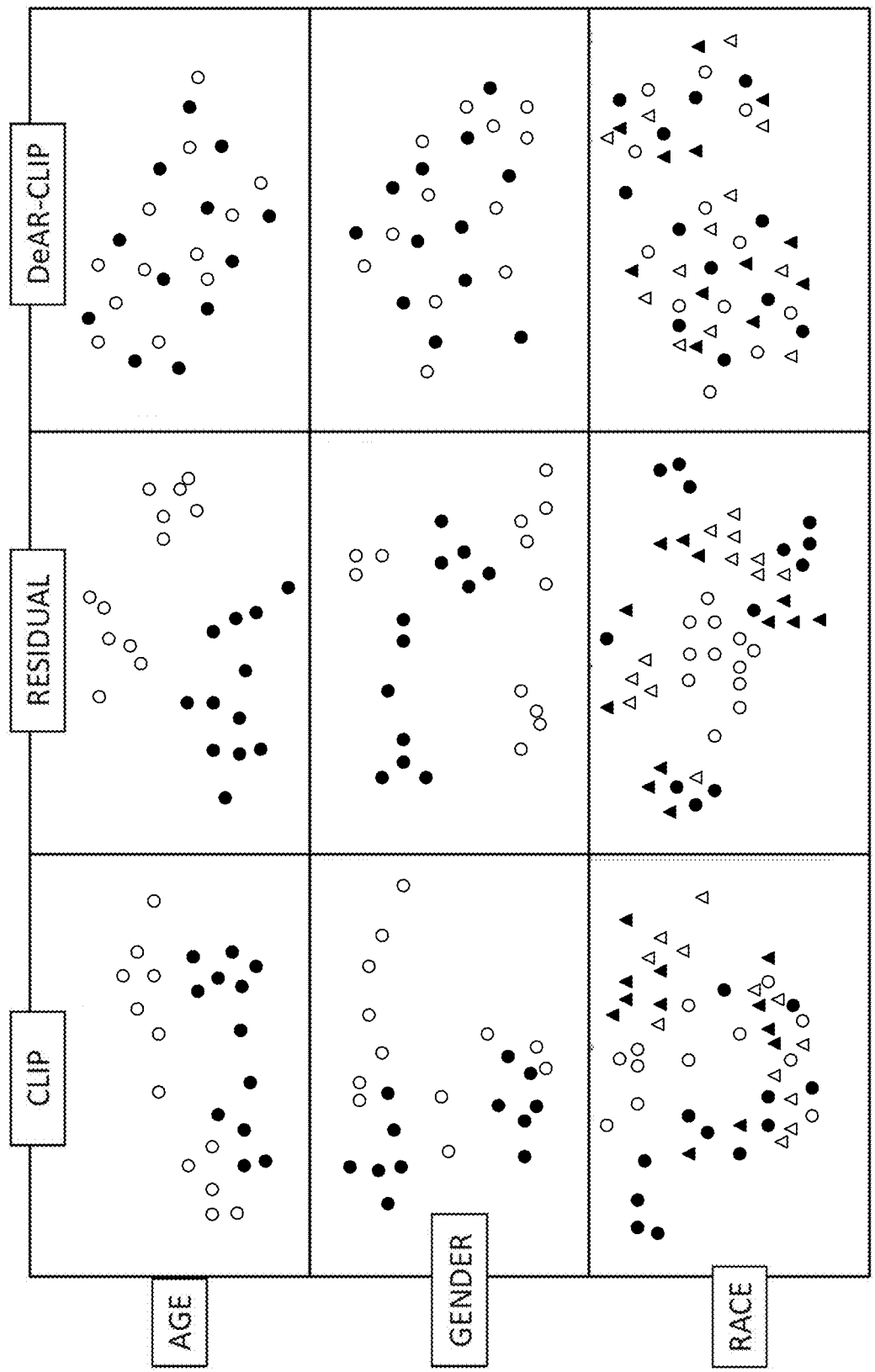
FIG. 7 illustrates TSNE plots demonstrating bias reductions effected by the VLM debiasing system for a vision-language model in accordance with one or more embodiments.

As discussed above, in some embodiments, the VLM debiasing system 102 improves the fairness of vision-language models. For instance, FIG. 7 illustrates experimental results that demonstrate the VLM debiasing system 102 reducing the bias of a vision-language model in accordance with one or more embodiments. Specifically, FIG. 7 shows TSNE plots comparing results for different systems.

As illustrated, FIG. 7 includes TSNE plots for a CLIP vision-language model (represented by "CLIP" in the left column of FIG. 7). In addition, FIG. 7 includes TSNE plots for residuals (protected attributes) from the CLIP model in the middle column ("RESIDUAL"). Further FIG. 7 includes TSNE plots for a version of the VLM debiasing system 102 ("DeAR-CLIP" in right column of FIG. 7). Stated differently, FIG. 7 shows TSNE plots of encoded image representations in the left column, protected attribute encodings in the middle column, and debiased image encodings in the right column. The CLIP vision-language model is described by Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. in Learning transferable visual models from natural language supervision, in *ICML,* 2021.

As depicted in FIG. 7, the TSNE plots provide a qualitative view of the accuracy improvements (in terms of fairness) provided by the VLM debiasing system 102. For example, the top row of FIG. 7 shows results for the protected attribute of age. As illustrated, the CLIP model produced noticeable separation or distinct clustering of plot points between young people and old people, thus indicating disparate treatment of the two labels within this protected attribute. The residuals in the middle column show this result in greater contrast. As shown in the right column, the VLM debiasing system 102 reduced the disparate treatment of the CLIP model by increasing the overlap of the old and young labels within the age protected attribute.

Similarly, the middle row of FIG. 7 shows results for the protected attribute of gender. As illustrated, the CLIP model produced noticeable separation of plot points between females and males, thereby indicating disparate treatment of the two labels within this protected attribute. The residuals in the middle column show this result in greater contrast. As shown in the right column, the VLM debiasing system 102 reduced the disparate treatment of the CLIP model by increasing the overlap of the female and male labels within the gender protected attribute.

Additionally, the bottom row of FIG. 7 shows results for the protected attribute of race. As illustrated, the CLIP model produced noticeable separation of plot points between various racial identities, thereby indicating disparate treatment of the several labels within this protected attribute. The residuals in the middle column show this result in greater contrast. As shown in the right column, the VLM debiasing system 102 reduced the disparate treatment of the CLIP model by increasing the overlap of the various labels within the race protected attribute.

As mentioned, in some embodiments, the VLM debiasing system 102 reduces bias of vision-language models. For instance, FIG. 8 illustrates a table of experimental results that demonstrate the VLM debiasing system 102 reducing skew metrics for two different vision-language models in accordance with one or more embodiments. Specifically, FIG. 8 shows a table of skew metrics for the CLIP and FLAVA vision-language models, with contrasts for results without and with the assistance of the VLM debiasing system 102. The FLAVA vision-language model is described by Amanpreet Singh, Ronghang Hu, Vedanuj Goswami, Guillaume Couairon, Wojciech Galuba, Marcus Rohrbach, and Douwe Kiela in Flava: A foundational language and vision alignment model, in *CVPR*, 2022.

In some embodiments, a measure of skew includes a measure of how different similarity scores (e.g., between an image and a text query, as described above) are across multiple protected labels within a protected attribute for a set of images. In some implementations, the measure of skew for an ith protected label is represented symbolically as follows:

$$\text{Skew}_i(I, T) = \log(f_i^m / f_i)$$

where I is a set of images, T is a text sequence, $f_i$ is the fraction of images within the set that contain the ith protected label, and $f_i^m$ is the fraction of images within the set that contain the ith protected label and satisfy a similarity threshold $\varepsilon$.

In some embodiments, the VLM debiasing system 102 determines a protected-attribute matching score for the digital image. A protected-attribute matching score includes an indication whether an image corresponds with a text sequence. To illustrate symbolically, the protected-attribute matching score can be represented as follows:

$$M_\varepsilon(I, T) = 1, \text{ when } Sim_E(I, T) \geq \varepsilon$$

$$M_\varepsilon(I, T) = 0, \text{ when } Sim_E(I, T) < \varepsilon$$

where $\varepsilon$ is the predetermined threshold and $Sim_E$ is the comparison metric (e.g., the cosine similarity) described above. In some implementations, the VLM debiasing system 102 determines a subset of images within a set of images that satisfy the similarity threshold. In other words, each image for which the protected-attribute matching score is one is included within the subset, whereas the images that have a protected-attribute matching score of zero are excluded from the subset. The VLM debiasing system 102, in some implementations, determines a measure of skew for the set as defined above, with $f_i^m$ being a proportion of images portraying a protected attribute in the subset of images that have a protected-attribute matching score of one, and with $f_i$ being a proportion of images portraying the same protected attribute in the overall set of images.

To illustrate for the protected attribute of gender and the protected label of female, the ratio of $f_i^m/f_i$ is the ratio of number of images portraying females in a subset of images that corresponds to a text query (e.g., "photo of a doctor") over the number of images portraying females in the overall set of images (including the images that do not correspond to the text query). To continue the example with females and doctors, a fair result of an image search would include the same proportion of women as candidate doctors as the total proportion of women in the overall dataset. When these two proportions are the same, the ratio of them is unity, and the logarithm is null, indicating zero skew.

As mentioned, in some embodiments, the VLM debiasing system 102 determines fairness metrics to measure a degree of fairness exhibited by a vision-language model. For instance, the VLM debiasing system 102 measures a mean MaxSkew and a mean MinSkew for a particular model and dataset. The mean MaxSkew represents selective association of a model in favor of a protected label (e.g., inclusion bias), and the mean MinSkew represents selective dissociation against a protected label (e.g., exclusion bias). For a set of images I, a set of text sequences T, and a protected attribute P, the VLM debiasing system 102 determines the MaxSkew and MinSkew, respectively, as follows:

$$\psi_{max}(I, T, P) = \text{Mean}_{t \in T}\left[\max_i(\text{Skew}_i(I, t))\right]$$

$$\psi_{min}(I, T, P) = -\text{Mean}_{t \in T}\left[\min_i(\text{Skew}_i(I, t))\right]$$

As depicted in FIG. 8, the VLM debiasing system 102 generally improves fairness of vision-language models by reducing, on the whole, the measures of skew. For instance, the top half of FIG. 8 shows MaxSkew and MinSkew values for the CLIP vision-language model (labeled with [C]) and the FLAVA vision-language model (labeled with [F]) without assistance from the VLM debiasing system 102. Furthermore, the top half of FIG. 8 also shows MaxSkew and MinSkew values for the CLIP vision-language model (labeled with $[C]_D$) and the FLAVA vision-language model (labeled with $[F]_D$) with assistance from the VLM debiasing system 102. With only a couple of exceptions, the VLM debiasing system 102 improves (e.g., reduces the MaxSkew towards zero, and increases the MinSkew towards zero) the fairness of the two models. The VLM debiasing system 102 produced the results shown in FIG. 8 using the FairFace dataset.

Moreover, in some implementations, the VLM debiasing system 102 determines a measure of skew by considering only a portion of the images in the dataset. In particular, the VLM debiasing system 102 determines MaxSkew@k and MinSkew@k values, which are determined using the same formula as MaxSkew and MinSkew, respectively, with the distinction that the VLM debiasing system 102 only considers the k most similar images to a text sequence. To illustrate, the bottom half of FIG. 8 shows MaxSkew@k and MinSkew@k values (labeled as MS@k and mS@k, respectively) for the CLIP and FLAVA vision-language models, without and with assistance from the VLM debiasing system 102. With only a few exceptions, the VLM debiasing system 102 improves (e.g., reduces the MaxSkew@k towards zero, and increases the MinSkew@k towards zero) the fairness of the two models. For the MaxSkew@k and MinSkew@k results shown in FIG. 8, the VLM debiasing system 102 utilized a value for k of 1000.

To further illustrate, in some embodiments, the VLM debiasing system 102 determines the MaxSkew and MinSkew metrics to measure the success of debiasing the vision-language models. Alternatively, or additionally, in some embodiments, the VLM debiasing system 102 determines the MaxSkew@k and MinSkew@k metrics to measure the success of debiasing the vision-language models. In other words, to evaluate debiasing performance, in some cases, the VLM debiasing system 102 determines whether a comparison metric satisfies a similarity threshold, as in the MaxSkew and MinSkew metrics, whereas in some cases, the VLM debiasing system 102 uses a k value to truncate the set of images to a number of top-corresponding images to the text sequence, as in the MaxSkew@k and MinSkew@k metrics.

The results depicted in FIGS. 7 and 8 are extensible to other vision-language models. The use of the CLIP and FLAVA vision-language models is not limiting. In some embodiments, the VLM debiasing system 102 utilizes a different vision-language model to generate image encodings.

As explained, a goal for a fair image search result is for the skew to be zero. Thus, in some embodiments, the VLM debiasing system 102 trains the additive residual learner to reduce the measure of skew. For example, the VLM debiasing system 102 tunes parameters of the additive residual learner based on a measure of loss for a set of digital images. In some embodiments, the VLM debiasing system 102 utilizes a measure of skew as the measure of loss.

Figure 9:
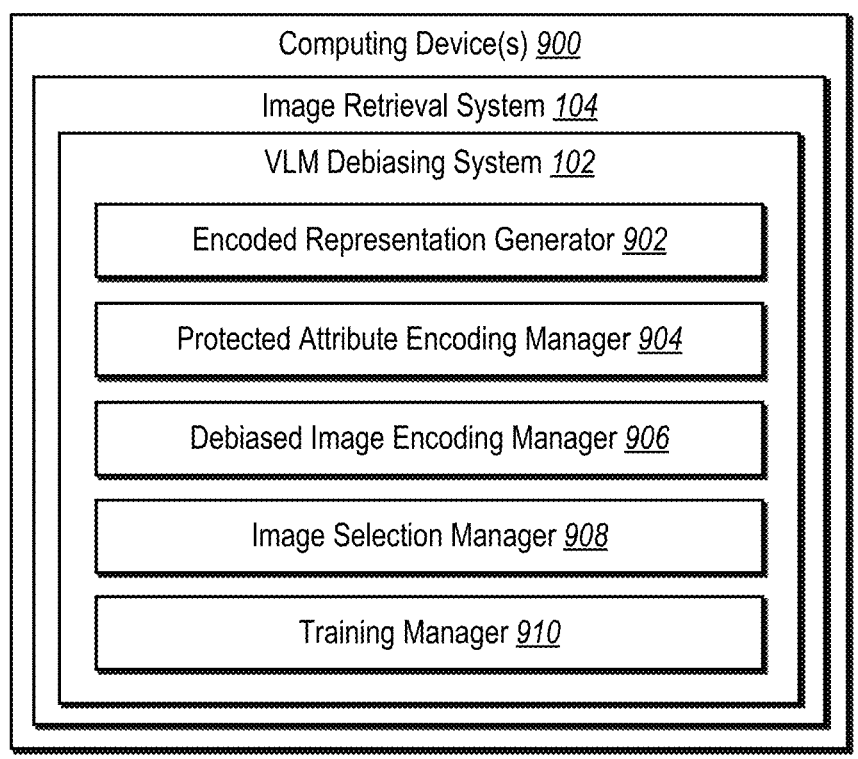
FIG. 9 illustrates a diagram of an example architecture of the VLM debiasing system in accordance with one or more embodiments.

Turning now to FIG. 9, additional detail will be provided regarding components and capabilities of one or more embodiments of the VLM debiasing system 102. In particular, FIG. 9 illustrates an example VLM debiasing system 102 executed by a computing device(s) 900 (e.g., the server device(s) 106 or the client device 108). As shown by the embodiment of FIG. 9, the computing device(s) 900 includes or hosts the image retrieval system 104 and/or the VLM debiasing system 102. Furthermore, as shown in FIG. 9, the VLM debiasing system 102 includes an encoded representation generator 902, a protected attribute encoding manager 904, a debiased image encoding manager 906, an image selection manager 908, and a training manager 910.

As shown in FIG. 9, the VLM debiasing system 102 includes an encoded representation generator 902. In some implementations, the encoded representation generator 902 generates an encoded image representation of a digital image. For example, the encoded representation generator 902 utilizes an image encoder of a vision-language neural network to generate the encoded image representation. Additionally, in some embodiments, the encoded representation generator 902 generates an encoded text representation for a text sequence. For example, the encoded representation generator 902 utilizes a text encoder of the vision-language neural network to generate the encoded text representation.

In addition, as shown in FIG. 9, the VLM debiasing system 102 includes a protected attribute encoding manager 904. In some implementations, the protected attribute encoding manager 904 extracts, utilizing an additive residual learner, a protected attribute encoding from the encoded image representation of the digital image. To illustrate, the protected attribute encoding manager 904 disentangles protected-attribute information from non-protected-attribute information encoded within the encoded image representation.

Moreover, as shown in FIG. 9, the VLM debiasing system 102 includes a debiased image encoding manager 906. In some implementations, the debiased image encoding manager 906 determines a debiased image encoding for the digital image by combining the protected attribute encoding and the encoded image representation. For instance, the debiased image encoding manager 906 determines an image encoding that excludes protected-attribute information encoded within the protected attribute encoding.

Furthermore, as shown in FIG. 9, the VLM debiasing system 102 includes an image selection manager 908. In some implementations, the image selection manager 908 selects the digital image for display via a client device. To illustrate, the image selection manager 908 selects the digital image based on the debiased image encoding satisfying a similarity threshold. In some cases, the image selection manager 908 omits a digital image from a subset of digital images for display via the client device, based on the debiased image encoding failing the similarity threshold.

Additionally, as shown in FIG. 9, the VLM debiasing system 102 includes a training manager 910. In some implementations, the training manager 910 trains the additive residual learner. For example, the training manager 910 tunes parameters of the additive residual learner based on a measure of loss for a set of digital images. Additionally, in some embodiments, the training manager 910 generates a protected attribute prediction for a digital image based on the debiased image encoding for the digital image. To illustrate, the training manager 910 utilizes a protected attribute classifier to generate the protected attribute prediction.

Each of the components 902-910 of the VLM debiasing system 102 can include software, hardware, or both. For example, the components 902-910 can include one or more instructions stored on a computer-readable storage medium and executable by processors of one or more computing devices, such as a client device or server device. When executed by the one or more processors, the computer-executable instructions of the VLM debiasing system 102 can cause the computing device(s) to perform the methods described herein. Alternatively, the components 902-910 can include hardware, such as a special purpose processing device to perform a certain function or group of functions. Alternatively, the components 902-910 of the VLM debiasing system 102 can include a combination of computer-executable instructions and hardware.

Furthermore, the components 902-910 of the VLM debiasing system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-910 may be implemented as a stand-alone application, such as a desktop or mobile application. Furthermore, the components 902-910 may be implemented as one or more web-based applications hosted on a remote server. The components 902-910 may also be implemented in a suite of mobile device applications or "apps." To illustrate, the components 902-910 may be implemented in an application, including but not limited to Adobe Creative Cloud, Adobe Express, Adobe Photoshop, and Adobe Sensei. The foregoing are either registered trademarks or trademarks of Adobe in the United States and/or other countries.

Figure 10:
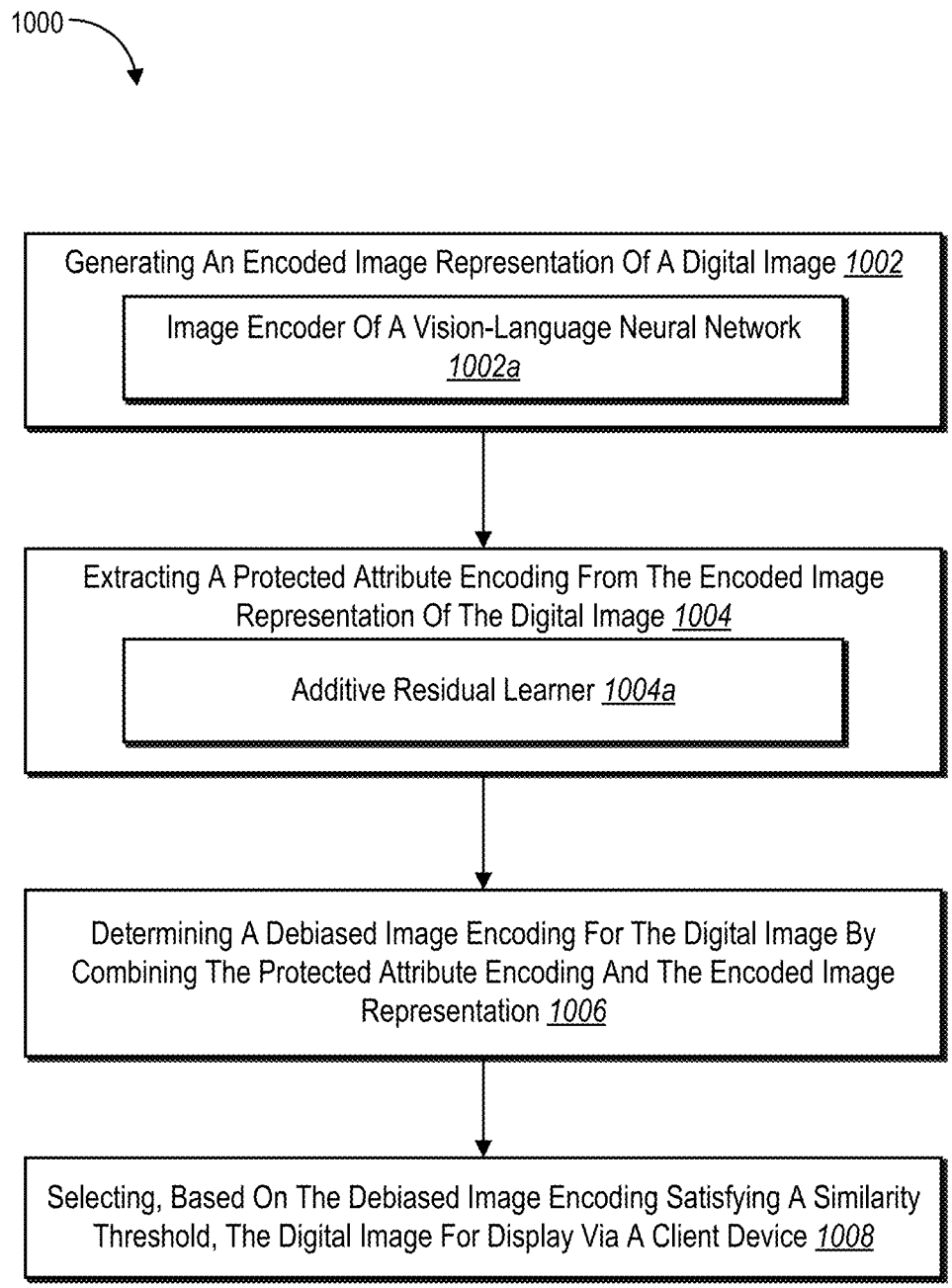
FIG. 10 illustrates a flowchart of a series of acts for debiasing vision-language models in accordance with one or more embodiments.

FIGS. 1-9, the corresponding text, and the examples provide a number of different methods, systems, devices, and non-transitory computer-readable media of the VLM debiasing system 102. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for debiasing vision-language models in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 of generating an encoded image representation of a digital image, an act 1004 of extracting a protected attribute encoding from the encoded image representation of the digital image, an act 1006 of determining a debiased image encoding for the digital image by combining the protected attribute encoding and the encoded image representation, and an act 1008 of selecting, based on the debiased image encoding satisfying a similarity threshold, the digital image for display via a client device.

In particular, the act 1002 can include generating, utilizing an image encoder of a vision-language neural network 1002a, an encoded image representation of a digital image, the act 1004 can include extracting, utilizing an additive residual learner 1004a, a protected attribute encoding from the encoded image representation of the digital image, the act 1006 can include determining a debiased image encoding for the digital image by combining the protected attribute encoding and the encoded image representation, and the act 1008 can include selecting, based on the debiased image encoding satisfying a similarity threshold, the digital image for display via a client device.

For example, in some embodiments, the series of acts 1000 includes wherein extracting the protected attribute encoding from the encoded image representation comprises processing the encoded image representation through a single-layer neural network to disentangle protected-attribute information from non-protected-attribute information encoded within the encoded image representation. Moreover, in some embodiments, the series of acts 1000 includes wherein determining the debiased image encoding for the digital image comprises determining an image encoding that excludes protected-attribute information encoded within the protected attribute encoding. Furthermore, in some implementations, the series of acts 1000 includes wherein combining the protected attribute encoding and the encoded image representation comprises adding a negative attribute encoding to remove protected-attribute information from the encoded image representation.

In addition, in some embodiments, the series of acts 1000 includes receiving a text query comprising a text sequence associated with the digital image; generating, utilizing a text encoder of the vision-language neural network, an encoded text representation for the text sequence; and determining a cosine similarity between the debiased image encoding and the encoded text representation. Additionally, in some embodiments, the series of acts 1000 includes determining that the cosine similarity satisfies a similarity threshold; and selecting, based on the cosine similarity satisfying the similarity threshold, the digital image for display via a client device. Alternatively, or additionally, in some implementations, the series of acts 1000 includes determining that the cosine similarity satisfies a similarity threshold; detecting, based on the cosine similarity satisfying the similarity threshold, an object portrayed in the digital image that corresponds to the text query; and generating an instance segmentation for the object for display via a client device.

Furthermore, in some embodiments, the series of acts 1000 includes wherein selecting the digital image for display via the client device comprises: determining a comparison metric between the debiased image encoding and an encoded text representation for a text sequence associated with the digital image; and determining that the comparison metric satisfies the similarity threshold.

Moreover, in some implementations, the series of acts 1000 includes generating, utilizing the image encoder of the vision-language neural network, an additional encoded image representation of an additional digital image; extracting, utilizing the additive residual learner, an additional protected attribute encoding from the additional encoded image representation of the additional digital image; and determining an additional debiased image encoding for the additional digital image by combining the additional protected attribute encoding and the additional encoded image representation. Additionally, in some embodiments, the series of acts 1000 includes selecting, based on the additional debiased image encoding satisfying the similarity threshold, the additional digital image for display via the client device. Alternatively, in some embodiments, the series of acts 1000 includes omitting, based on the additional debiased image encoding failing the similarity threshold, the additional digital image from a subset of digital images for display via the client device.

In some implementations, the series of acts 1000 includes generating, utilizing an image encoder of the vision-language neural network, an encoded image representation of a digital image; extracting, utilizing the additive residual learner, a protected attribute encoding from the encoded image representation of the digital image by disentangling protected-attribute information in the protected attribute encoding from the encoded image representation; determining a debiased image encoding for the digital image by combining the protected attribute encoding and the encoded image representation; and generating, utilizing the protected attribute classifier, a protected attribute prediction for the digital image based on the debiased image encoding. Moreover, in some embodiments, the series of acts 1000 includes determining a measure of loss based on the debiased image encoding for the digital image; and tuning parameters of the additive residual learner based on the measure of loss. For instance, in some embodiments, the series of acts 1000 includes determining a reconstruction loss by comparing the debiased image encoding with the encoded image representation. As another example, in some embodiments, the series of acts 1000 includes determining an entropy loss by determining a probability distribution for the protected attribute prediction. As yet another example, in some implementations, the series of acts 1000 includes determining a cross-entropy loss by comparing the protected attribute prediction with a ground truth protected attribute for the digital image.

Furthermore, in some embodiments, the series of acts 1000 includes wherein extracting the protected attribute encoding from the encoded image representation comprises processing the encoded image representation through a single-layer neural network to disentangle the protected-attribute information from non-protected-attribute information encoded within the encoded image representation. In addition, in some implementations, the series of acts 1000 includes generating, utilizing a text encoder of the vision-language neural network, an encoded text representation for a text sequence associated with the digital image; determining a cosine similarity between the debiased image encoding and the encoded text representation; determining a protected-attribute matching score for the digital image based on the cosine similarity; and determining, from a set of digital images comprising the digital image and based on the protected-attribute matching score for the digital image, a measure of skew for the additive residual learner. Moreover, in some embodiments, the series of acts 1000 includes training the additive residual learner to reduce the measure of skew by tuning parameters of the additive residual learner based on a measure of loss for the set of digital images.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
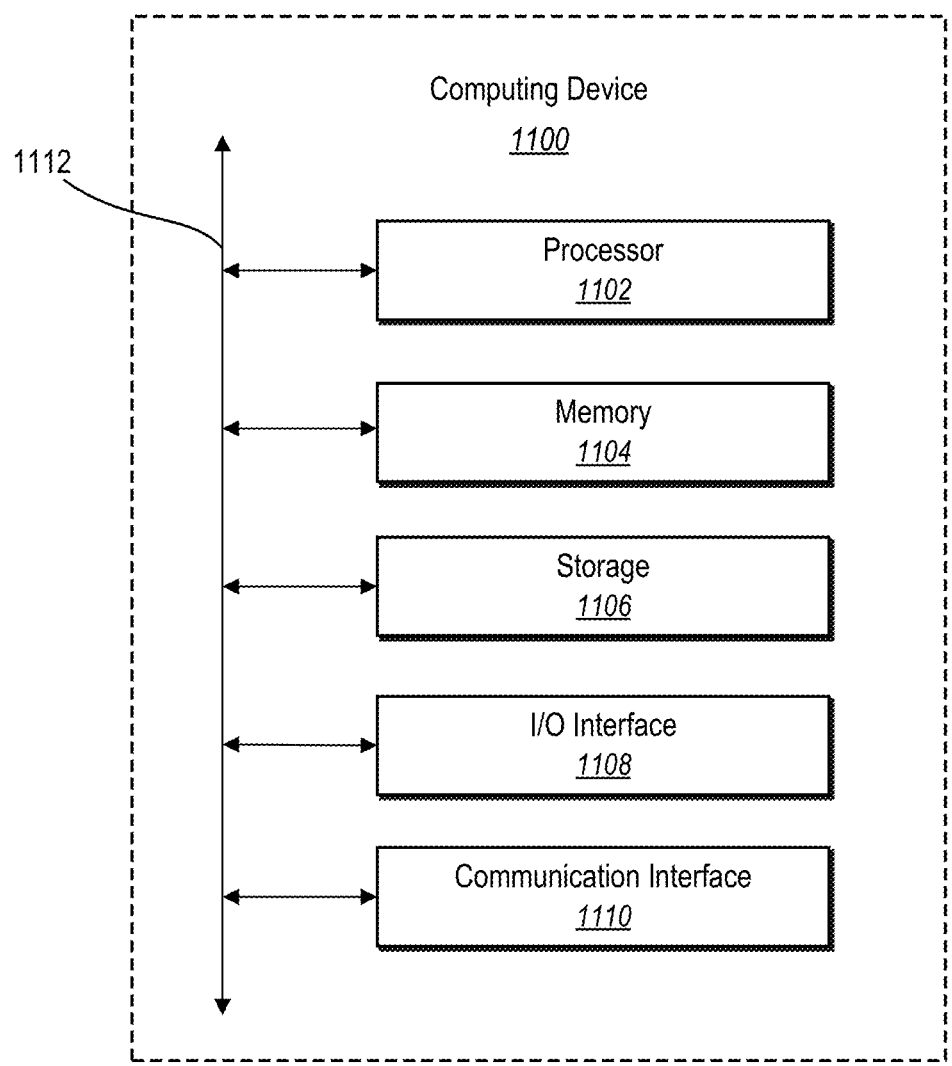
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device(s) 900, the server device(s) 106, or the client device 108). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes the memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes the storage device 1106 for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include the bus 1112. The bus 1112 can include hardware, software, or both that connects components of computing device 1100 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, utilizing an image encoder of a vision-language neural network, an encoded image representation of a digital image;
   extracting, utilizing an additive residual learner, a protected attribute encoding from the encoded image representation of the digital image; and
   determining a debiased image encoding for the digital image by combining the protected attribute encoding and the encoded image representation.

2. The computer-implemented method of claim 1, wherein extracting the protected attribute encoding from the encoded image representation comprises processing the encoded image representation through a single-layer neural network to disentangle protected-attribute information from non-protected-attribute information encoded within the encoded image representation.

3. The computer-implemented method of claim 1, wherein determining the debiased image encoding for the digital image comprises determining an image encoding that excludes protected-attribute information encoded within the protected attribute encoding.

4. The computer-implemented method of claim 1, further comprising:
   receiving a text query comprising a text sequence associated with the digital image;
   generating, utilizing a text encoder of the vision-language neural network, an encoded text representation for the text sequence; and
   determining a cosine similarity between the debiased image encoding and the encoded text representation.

5. The computer-implemented method of claim 4, further comprising:
   determining that the cosine similarity satisfies a similarity threshold; and
   selecting, based on the cosine similarity satisfying the similarity threshold, the digital image for display via a client device.

6. The computer-implemented method of claim 4, further comprising:
   determining that the cosine similarity satisfies a similarity threshold;
   detecting, based on the cosine similarity satisfying the similarity threshold, an object portrayed in the digital image that corresponds to the text query; and
   generating an instance segmentation for the object for display via a client device.

7. A system comprising:
   one or more memory devices comprising a vision-language neural network, an additive residual learner, and a protected attribute classifier; and
   one or more processors configured to cause the system to:
     generate, utilizing an image encoder of the vision-language neural network, an encoded image representation of a digital image;
     extract, utilizing the additive residual learner, a protected attribute encoding from the encoded image representation of the digital image by disentangling protected-attribute information in the protected attribute encoding from the encoded image representation;
     determine a debiased image encoding for the digital image by combining the protected attribute encoding and the encoded image representation; and
     generate, utilizing the protected attribute classifier, a protected attribute prediction for the digital image based on the debiased image encoding.

8. The system of claim 7, wherein the one or more processors are further configured to cause the system to:
   determine a measure of loss based on the debiased image encoding for the digital image; and
   tune parameters of the additive residual learner based on the measure of loss.

9. The system of claim 7, wherein the one or more processors are further configured to cause the system to determine a reconstruction loss by comparing the debiased image encoding with the encoded image representation.

10. The system of claim 7, wherein the one or more processors are further configured to cause the system to determine an entropy loss by determining a probability distribution for the protected attribute prediction.

11. The system of claim 7, wherein the one or more processors are further configured to cause the system to determine a cross-entropy loss by comparing the protected attribute prediction with a ground truth protected attribute for the digital image.

12. The system of claim 7, wherein extracting the protected attribute encoding from the encoded image representation comprises processing the encoded image representation through a single-layer neural network to disentangle the protected-attribute information from non-protected-attribute information encoded within the encoded image representation.

13. The system of claim 7, wherein the one or more processors are further configured to cause the system to:
   generate, utilizing a text encoder of the vision-language neural network, an encoded text representation for a text sequence associated with the digital image;
   determine a cosine similarity between the debiased image encoding and the encoded text representation;
   determine a protected-attribute matching score for the digital image based on the cosine similarity; and
   determine, from a set of digital images comprising the digital image and based on the protected-attribute matching score for the digital image, a measure of skew for the additive residual learner.

14. The system of claim 13, wherein the one or more processors are further configured to cause the system to train the additive residual learner to reduce the measure of skew by tuning parameters of the additive residual learner based on a measure of loss for the set of digital images.

15. A non-transitory computer-readable medium storing executable instructions that, when executed by a processing device, cause the processing device to perform operations comprising:

generating, utilizing an image encoder of a vision-language neural network, an encoded image representation of a digital image;
extracting, utilizing an additive residual learner, a protected attribute encoding from the encoded image representation of the digital image;
determining a debiased image encoding for the digital image by combining the protected attribute encoding and the encoded image representation; and
selecting, based on the debiased image encoding satisfying a similarity threshold, the digital image for display via a client device.

16. The non-transitory computer-readable medium of claim 15, wherein combining the protected attribute encoding and the encoded image representation comprises adding a negative attribute encoding to remove protected-attribute information from the encoded image representation.

17. The non-transitory computer-readable medium of claim 15, wherein selecting the digital image for display via the client device comprises:
determining a comparison metric between the debiased image encoding and an encoded text representation for a text sequence associated with the digital image; and
determining that the comparison metric satisfies the similarity threshold.

18. The non-transitory computer-readable medium of claim 15, wherein the operations further comprise:
generating, utilizing the image encoder of the vision-language neural network, an additional encoded image representation of an additional digital image;
extracting, utilizing the additive residual learner, an additional protected attribute encoding from the additional encoded image representation of the additional digital image; and
determining an additional debiased image encoding for the additional digital image by combining the additional protected attribute encoding and the additional encoded image representation.

19. The non-transitory computer-readable medium of claim 18, wherein the operations further comprise:
selecting, based on the additional debiased image encoding satisfying the similarity threshold, the additional digital image for display via the client device.

20. The non-transitory computer-readable medium of claim 18, wherein the operations further comprise:
omitting, based on the additional debiased image encoding failing the similarity threshold, the additional digital image from a subset of digital images for display via the client device.

* * * * *